June 28, 1960 C. E. LOMAX 2,943,154

TOLL TELEPHONE SYSTEM

Filed Jan. 16, 1956 10 Sheets-Sheet 1

INVENTOR.
Clarence E. Lomax.
BY
Smith, Olsen, Baird & Miller
Attys.

June 28, 1960 C. E. LOMAX 2,943,154

TOLL TELEPHONE SYSTEM

Filed Jan. 16, 1956 10 Sheets-Sheet 2

INVENTOR.
Clarence E. Lomax.
BY
Smith, Olsen, Baird & Miller
Attys.

June 28, 1960 C. E. LOMAX 2,943,154

TOLL TELEPHONE SYSTEM

Filed Jan. 16, 1956 10 Sheets-Sheet 3

INVENTOR.
Clarence E. Lomax
BY
Smith, Olsen, Baird & Miller
Attys.

INVENTOR.
Clarence E. Lomax
BY
Smith, Olsen, Baird & Miller
Attys.

June 28, 1960 C. E. LOMAX 2,943,154

TOLL TELEPHONE SYSTEM

Filed Jan. 16, 1956 10 Sheets-Sheet 5

INVENTOR.
Clarence E. Lomax
BY
Smith, Olsen, Baird & Miller
Attys.

June 28, 1960 C. E. LOMAX 2,943,154

TOLL TELEPHONE SYSTEM

Filed Jan. 16, 1956 10 Sheets-Sheet 6

INVENTOR.
Clarence E. Lomax

BY Smith, Olsen, Bird & Miller
Attys.

June 28, 1960 C. E. LOMAX 2,943,154

TOLL TELEPHONE SYSTEM

Filed Jan. 16, 1956 10 Sheets-Sheet 7

INVENTOR.
Clarence E. Lomax
BY
Smith, Olsen, Baird & Miller
Attys.

INVENTOR.
Clarence E. Lomax
BY
Smith, Olsen, Baird & Miller
Attys.

INVENTOR.
Clarence E. Lomax
BY
Smith, Olsen, Baird & Miller
Attys.

INVENTOR.
Clarence E. Lomax
BY Smith, Olsen, Baird & Miller
Attys.

2,943,154
Patented June 28, 1960

2,943,154

TOLL TELEPHONE SYSTEM

Clarence E. Lomax, Chicago, Ill., assignor to Automatic Electric Laboratories, Inc., a corporation of Delaware Filed Jan. 16, 1956, Ser. No. 559,141
5 Claims. (Cl. 179—27)

The present invention relates to telephone systems and particularly to systems comprising toll offices including manual and automatic facilities for completing toll connections.

In a toll system, interexchange calls are routed over toll lines and trunks interconnecting the exchanges, and the line switching operations, which are required in routing the calls to the desired substations in the exchanges, are performed manually at an operator position in the called exchange or are effected on an automatic basis through the provision of toll and local switching equipment of the automatic type which is controllable from the operator position in the calling exchange.

It is an object of the present invention to provide in a system of the character described, improved facilities of simple arrangement and construction for rendering control and supervision of the toll connections at the operator's position in the calling exchange.

An additional object of the present invention is to provide in a system of the character described, improved facilities whereby toll calls from a distant exchange may be switched directly to substations or sub-offices of a main exchange and the supervision of the calls may be accomplished in a simple and reliable manner at the calling operator's position in the distant exchange.

An additional object of the invention is to provide in a system of the character described, improved facilities whereby connections to substations and sub-offices of a main exchange may be completed over trunks in the main exchange which may be seized either from the operator's position in the main exchange and by switching equipment therein controlled over a toll line from an operator's position in a distant exchange and wherein supervision of the connection is exclusive to the seizing operator.

An additional object of the invention is to provide in a system of the character described, an improved trunk circuit for trunks in the main exchange having access to substations or sub-offices thereof and which may be seized either from the operator's position in the main exchange and by switching equipment therein controlled from an operator's position in a distant exchange wherein the trunk circuit is controlled in response to seizure of the corresponding trunk line from one of the operator's positions to prevent seizure thereof from the other of the operator's positions.

Further features of the invention pertain to the particular arrangement of the circuit elements of the telephone system, whereby the above outlined and additional features thereof are attained.

*Section 1.—The general arrangement of the telephone system*

Figure 1:
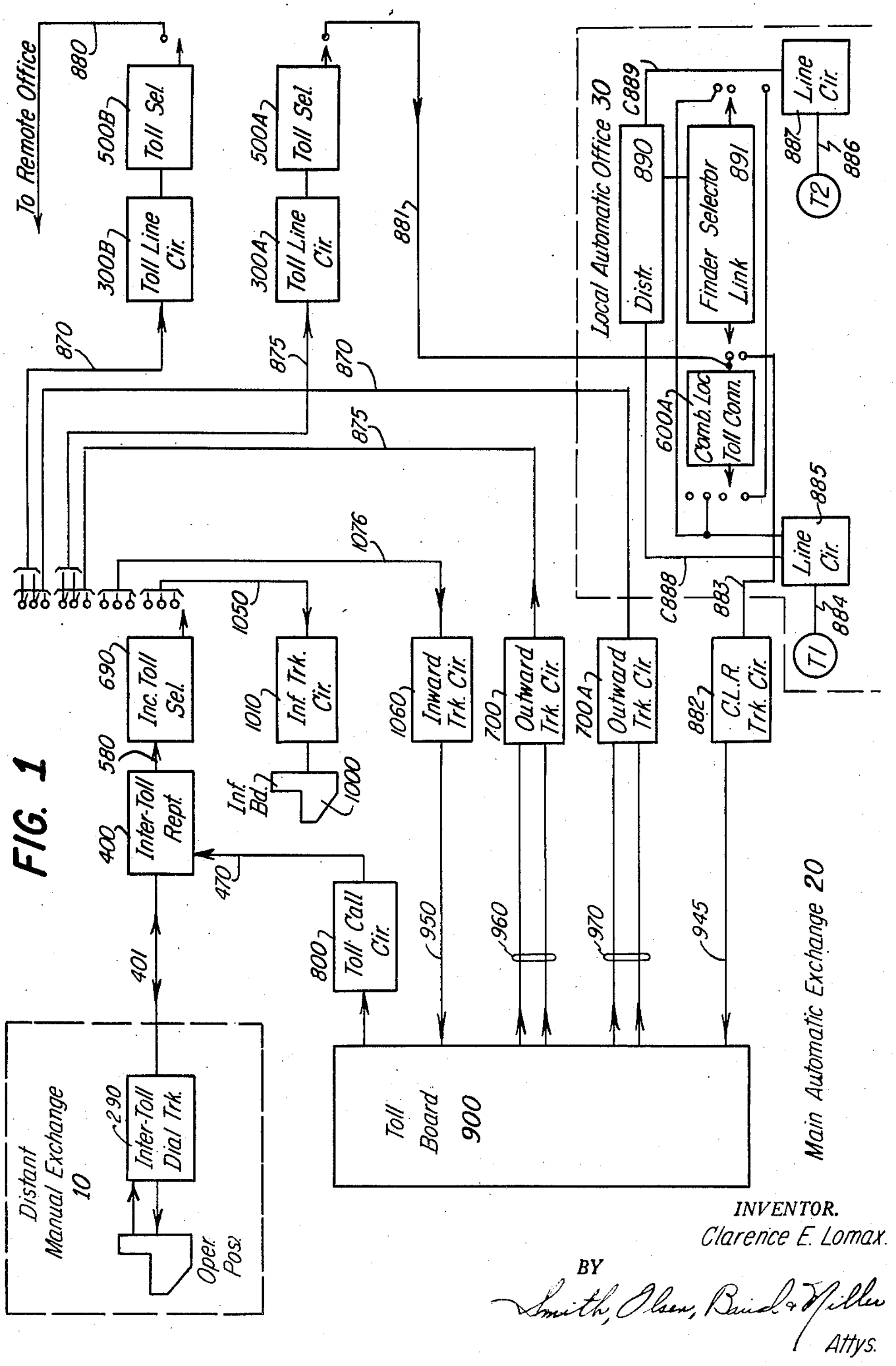
Figure 11:
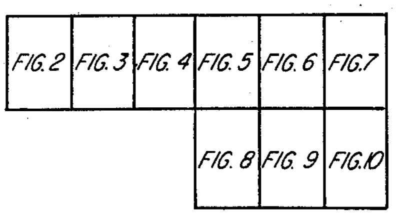

The invention both as to its organization and method of operation, together with further objects and advantages thereof will best be understood by reference to the following specification taken in conjunction with the accompanying drawings, in which Fig. 1 is a schematic diagram of the area served by a telephone system embodying the present invention and illustrating the general arrangement of the apparatus incorporated in the exchanges thereof; Figs. 2 to 10 inclusive taken together illustrate the details of certain parts of the apparatus incorporated in the telephone system, which apparatus has embodied therein the features of the invention as briefly outlined above; and Figure 11 illustrates the mode of combining Figures 2 to 10 inclusive to form a unified diagram.

Figure 2:
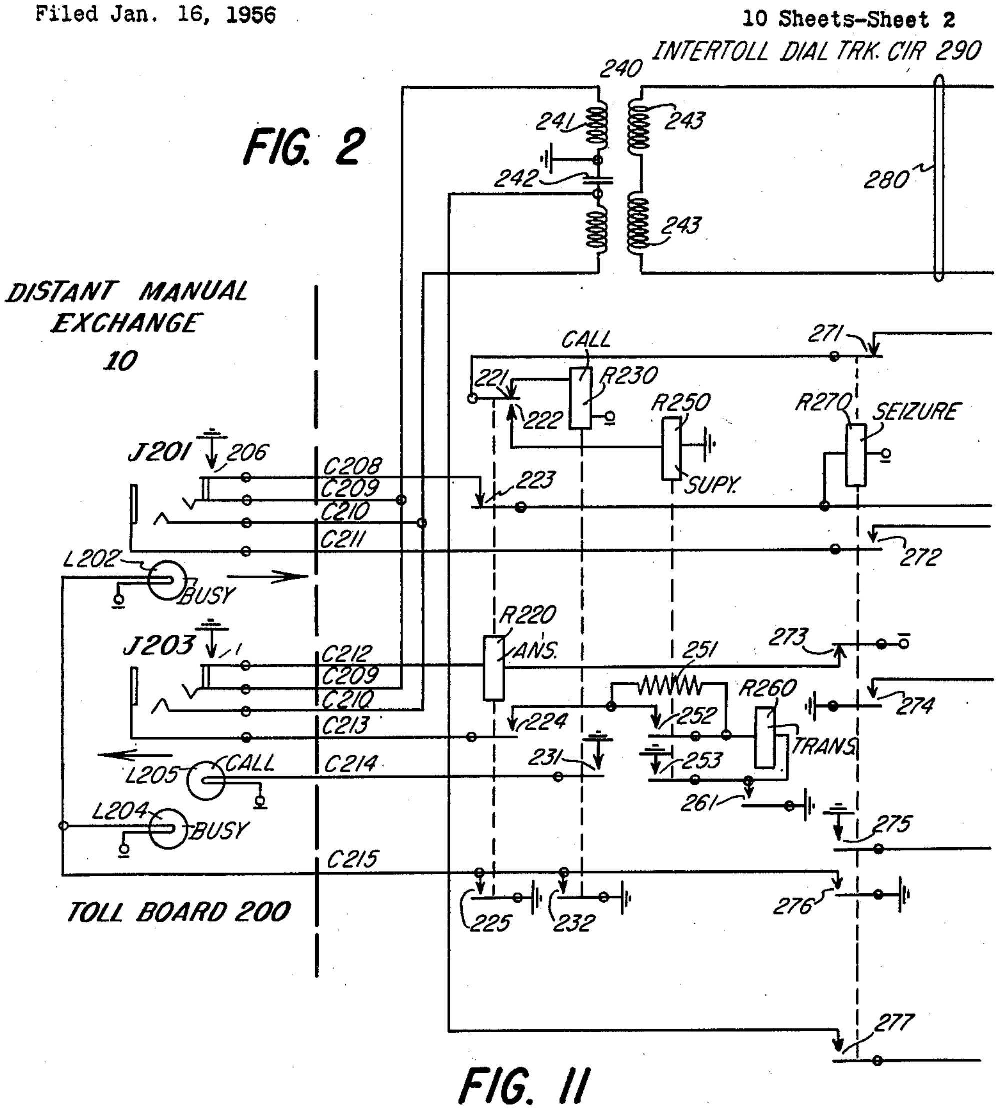
Figure 3:
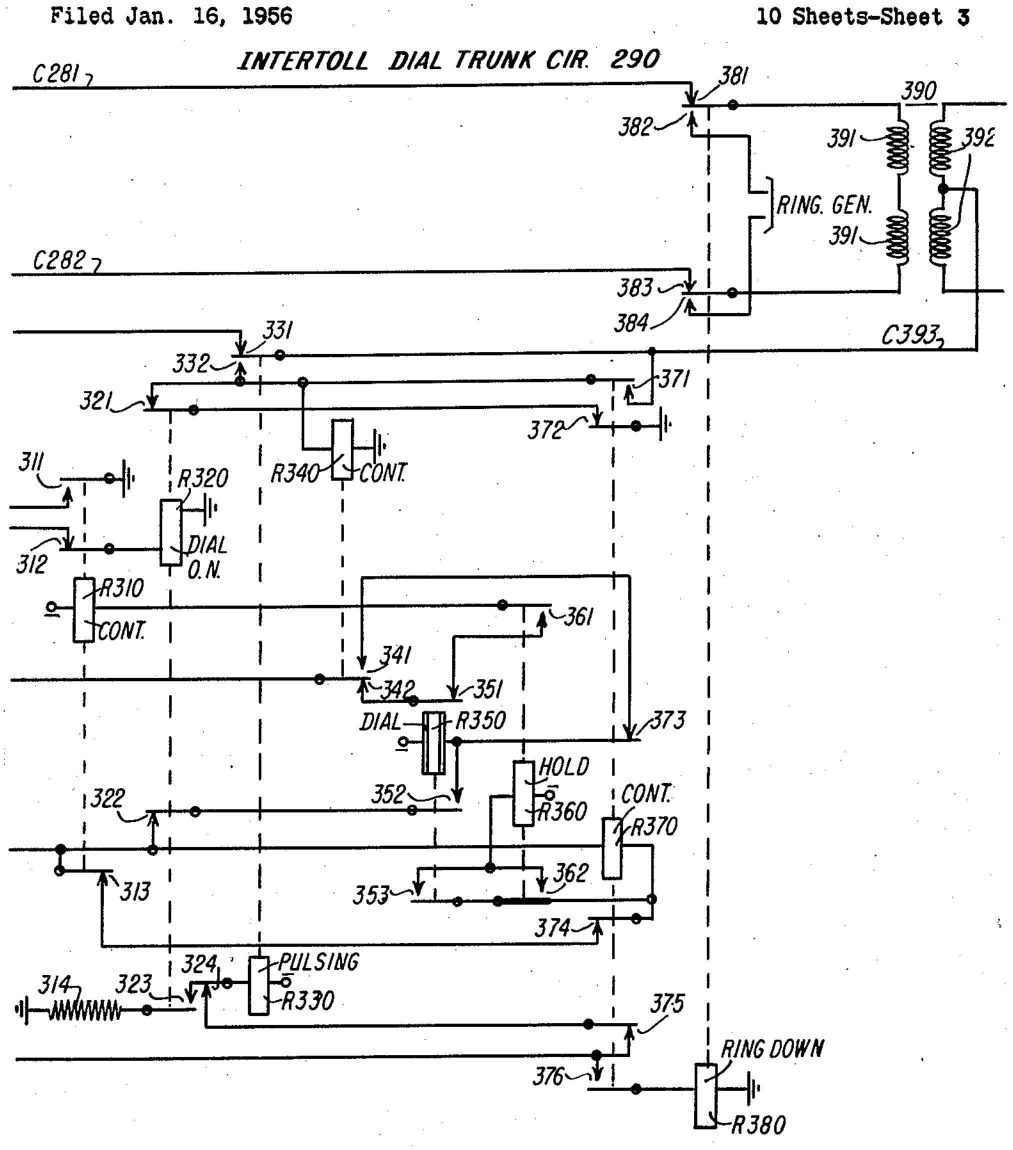
Figure 4:
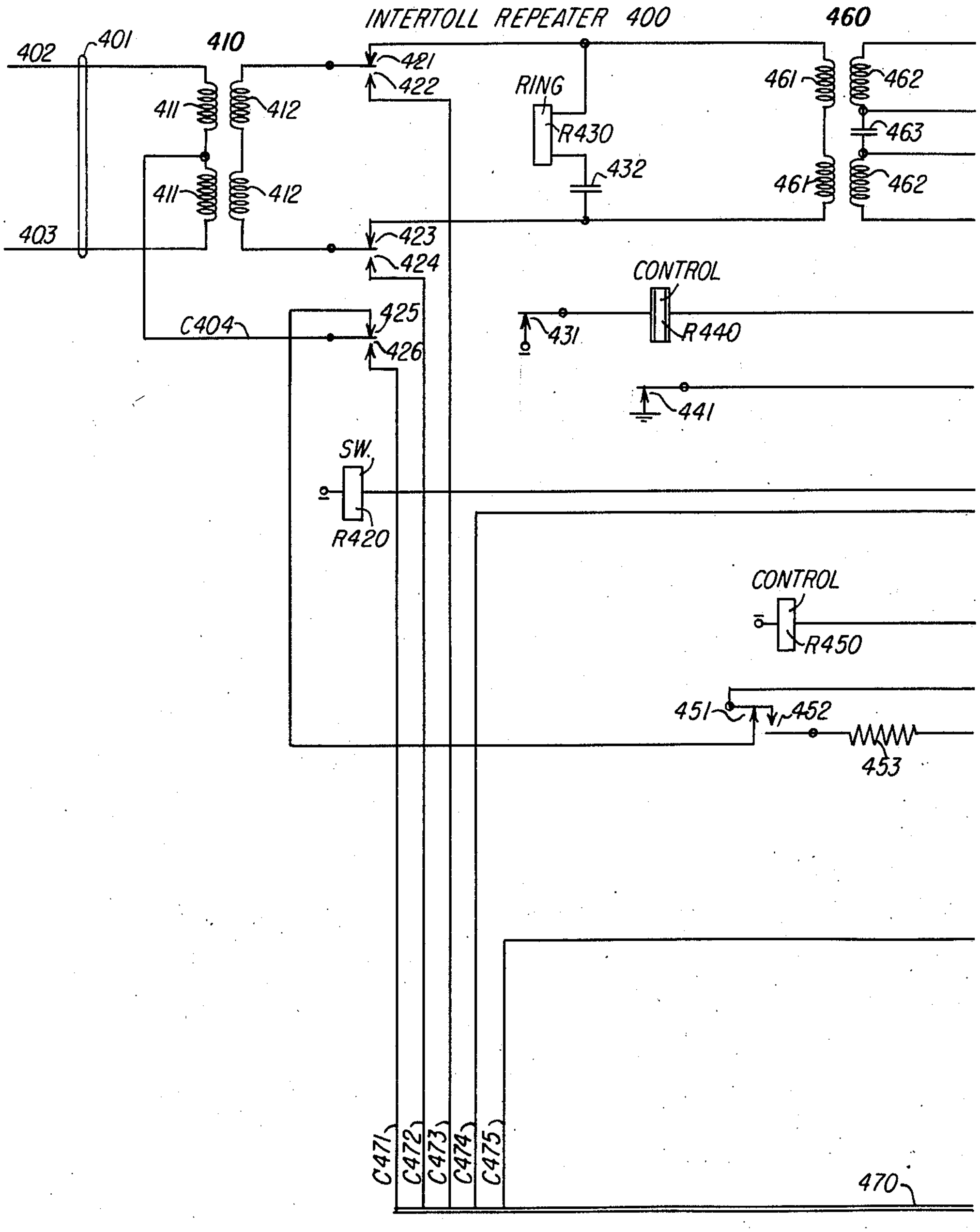
Figure 5:
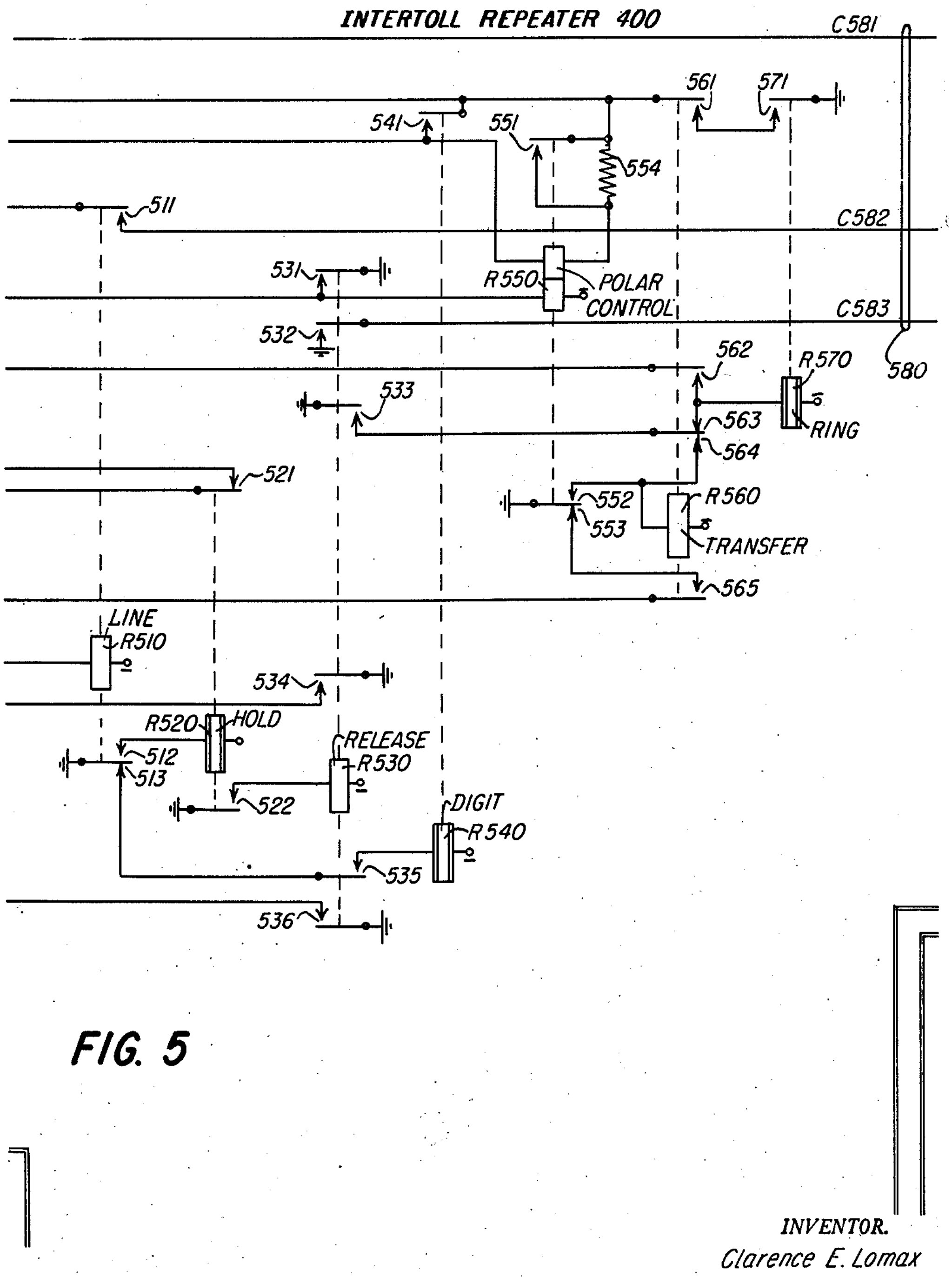
Figure 6:
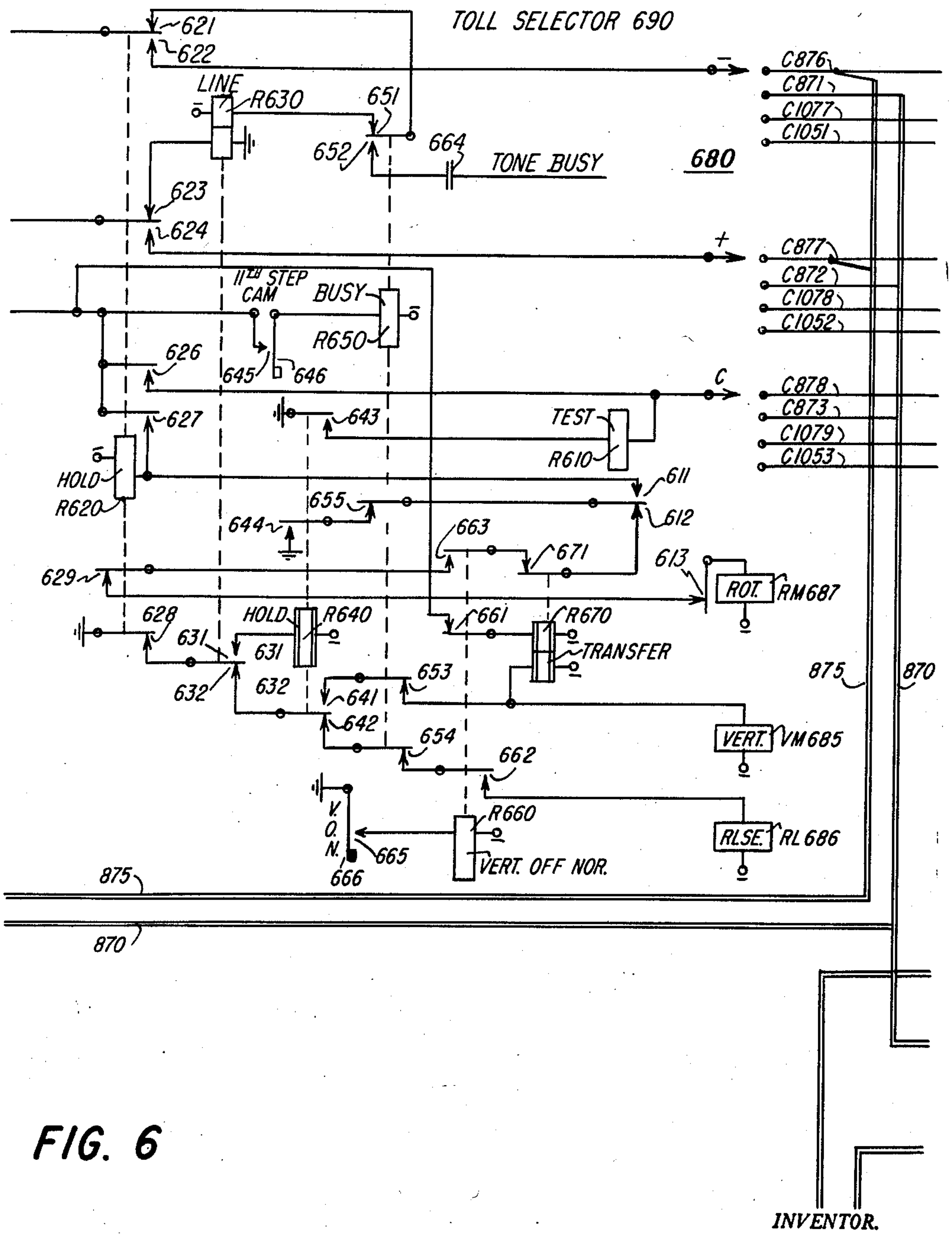
Figure 7:
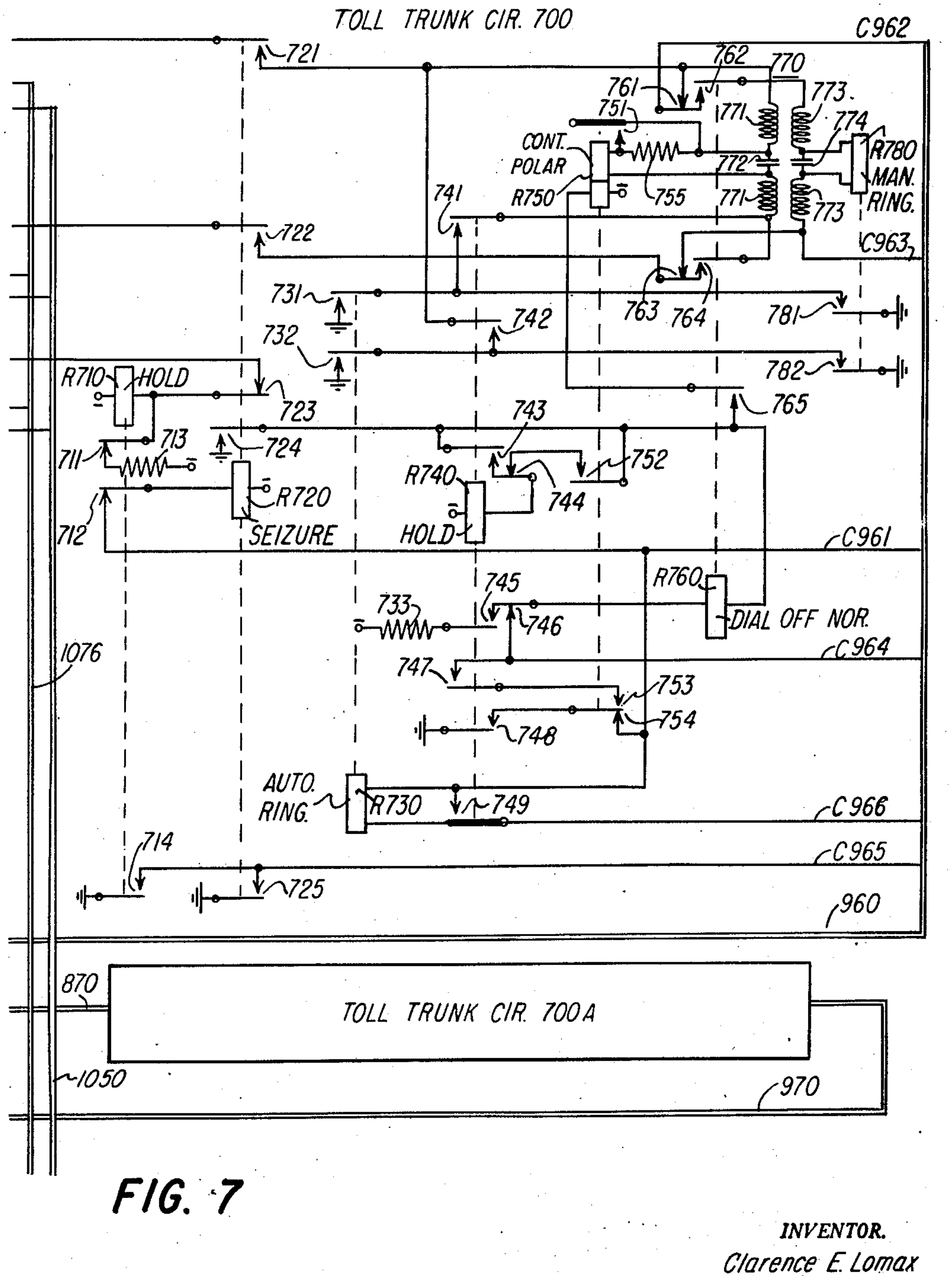
Figure 8:
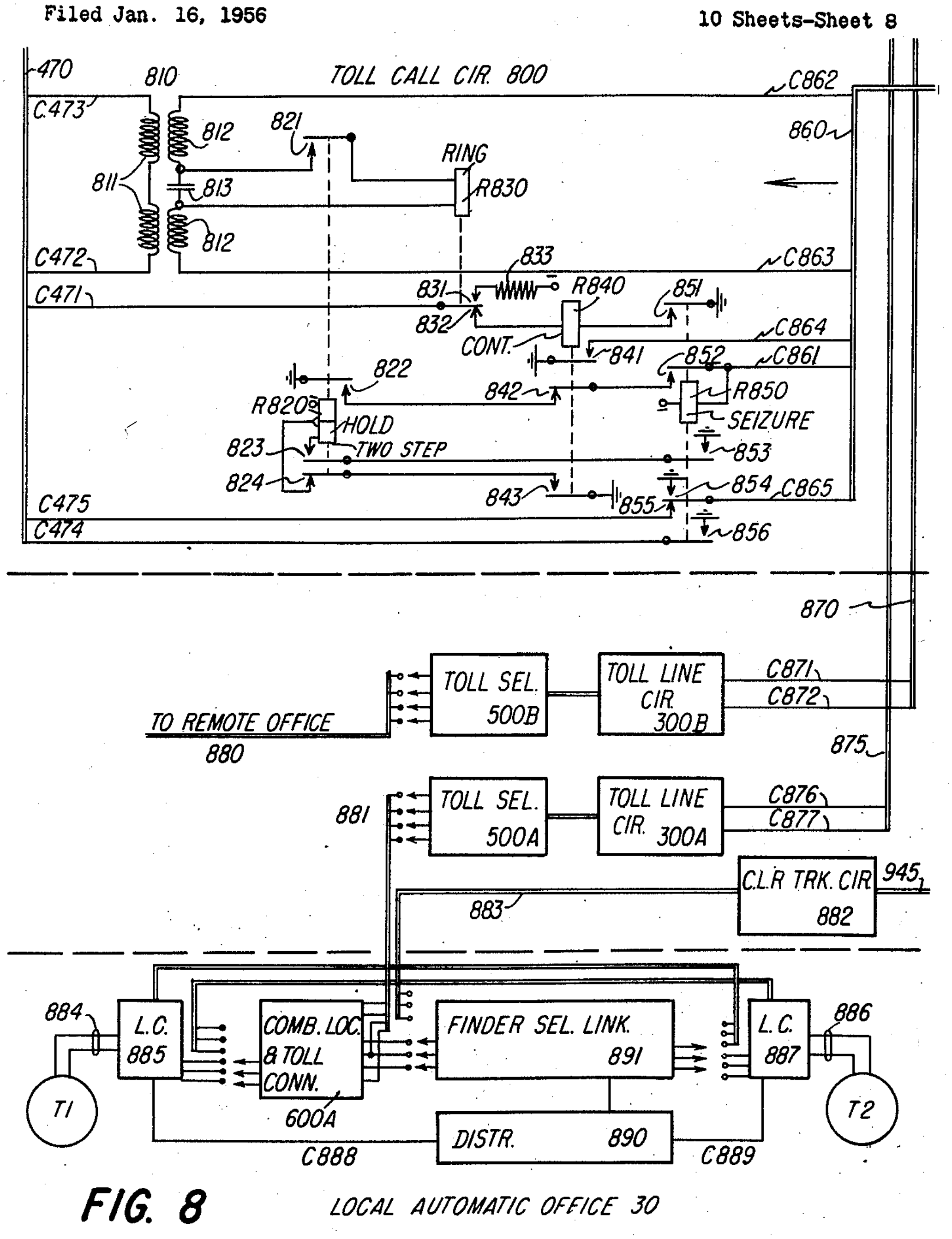
Figure 9:
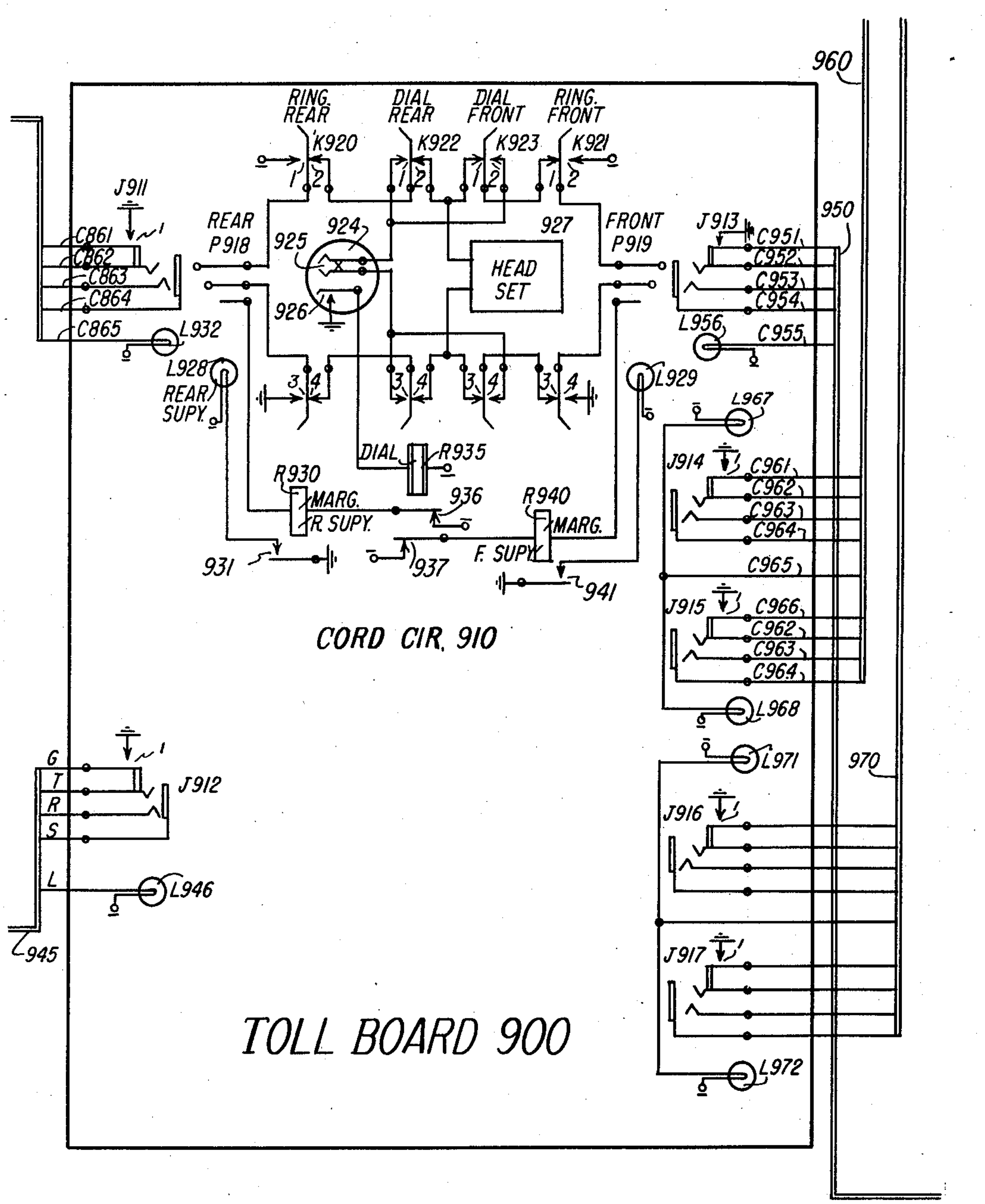
Figure 10:
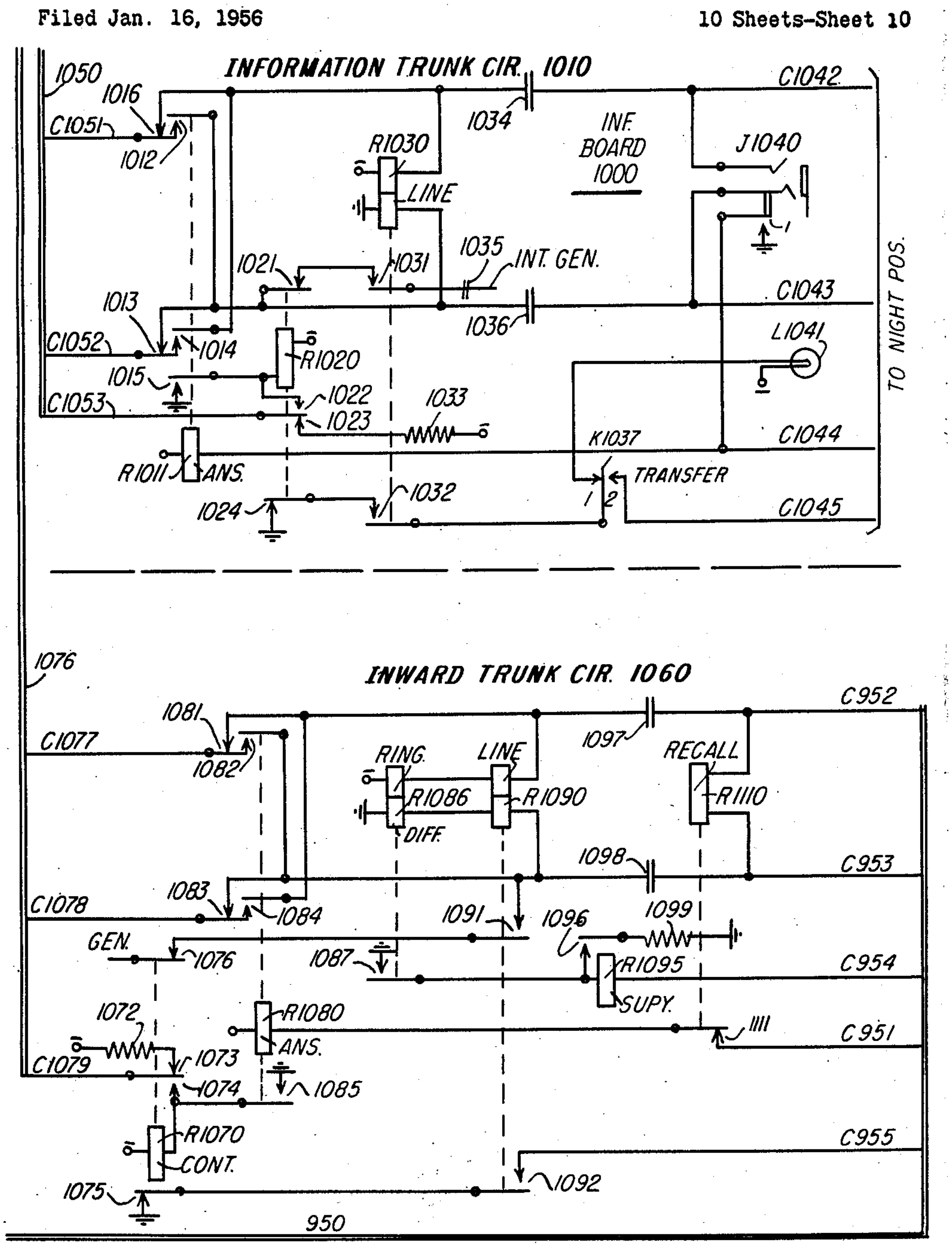

More particularly, a portion of Fig. 2 taken in conjunction with Fig. 3 illustrates the details of one of a group of intertoll dial trunk circuits in a distant manual exchange; Figs. 4 and 5 taken together illustrate the details of the one intertoll repeaters in the automatic exchange; Fig. 6 illustrates the details of a toll selector in the automatic exchange; a portion of Fig. 7 illustrates the details of one of the toll trunk circuits in the automatic exchange; a portion of Fig. 8 illustrates the automatic to manual toll call circuit included in the automatic exchange; Fig. 9 illustrates the details of one of a cord circuit disposed at the toll board in the automatic exchange; a portion of Fig. 10 illustrates the details of one of a group of information trunk circuits included in the automatic exchange; and the other portion of Fig. 10 illustrates one of a group of inward trunk circuits in the automatic exchange.

Referring now more particularly to Fig. 1, the telephone system there illustrated serves an area comprising a distant manual exchange 10, and a main automatic exchange 20; the distant exchange 10 is of the manual type, serving stations of any suitable type, and comprising a manual dial toll board 200; and the main automatic exchange 20 is of the automatic type, serving stations of any suitable type and comprises a manual dial toll board 900 and an information board 1000. Specifically, the main automatic exchange 20 serves a plurality of groups of stations, including a local automatic office 30 and a remote office, the local automatic office including the subscriber stations T1 and T2 having extended thereto, respectively, subscriber lines 884 and 886 that are provided with individually associated line circuits 885 and 887, of any suitable type.

The distant manual exchange 10 and the main automatic exchange 20 are interconnected by a group of toll lines including a toll line 401 which is of the two-way type terminating in the intertoll dial trunk circuit 290 in the distant exchange 10 and in the intertoll repeater 400 in the main exchange 20.

The local automatic office 30 included in the main automatic exchange 20 comprises a local switch train including a group of finder-selector links and a group of connectors. Specifically, the group of finder-selector links includes the link 891 illustrated, which group is provided with a distributor 890, the finder-selector link 891 having access to a group of subscriber lines including the subscriber lines 884 and 886 extending to the subscriber stations T1 and T2, respectively, and the line circuits 885 and 887 individually associated with the subscriber lines 884 and 886 being connected to the distributor 890 by start conductors C888 and C889, respectively. The group of connectors in the local switch train of the local automatic office 30 includes the combined local and toll connector 600A which is accessible from the group of finder-selector links including the link 891 and which has access to the group of subscriber lines including the subscriber lines 884 and 886.

Also the main automatic exchange 20 comprises a toll switch train including a group of incoming toll selectors, one of the group being the toll selector 690 which is individually connected to the intertoll repeater 400 by a trunk 580 extending therebetween. Also, intertoll repeater 400 is accessible to the toll board 900 via a toll line circuit 800 and a trunk 470 extending therefrom. The incoming toll selector 690 has access to two groups of toll lines, a group of inward trunks and a group of information trunks, wherein the first group of toll lines includes a toll line 870 connected to a toll line circuit 300B and an individually associated toll selector 500B; the second group of toll lines includes the toll line 875 having access to the toll line circuit 300A and the associated toll selector 500A; the group of inward trunks includes a trunk 1076 extending to the inward trunk circuit 1060 which is connected via the trunk 950 to the toll board 900; and the group of information trunks includes the information trunk 1050 extending to the information trunk circuit 1010 associated with the information board 1000. The toll line 875 is also accessible from the toll board 900 via the trunk 960 and the toll trunk circuit 700; and the toll line 870 is accessible from the toll board 900 via the trunk 970 and the toll trunk circuit 700A. The toll selector 500A has access to a group of trunks including the trunk 881 extending to the local automatic office and having access therein to a group of combined local and toll connectors including the combined local and toll connector 600A, which is accessible to the finder-selector links and has access to the group of subscriber lines. The toll selector 500B has access to a group of trunks including the trunk line 880 which extends to a remote office, not shown.

Finally, the main automatic exchange 20 comprises a group of C.L.R. trunk circuits, including the C.L.R. trunk circuit 882, which have access to the toll board 900 via a group of trunks including the trunk 945. The C.L.R. trunk circuit 882, etc. are accessible to the finder-selector links 891, etc., in the local automatic office via trunks 883, etc., extending thereto.

*Section 2.—The apparatus incorporated in the telephone system*

In the distant manual exchange 10, the toll board 200 is of the conventional manual dial type including cord circuits, not shown. In the main automatic exchange 20 the toll board 900, as well as the information board 1000, is of the conventional manual dial type. Additionally, the line circuits 885, etc., as well as the distributor 890 are of any suitable types, while the finder-selector links 891, etc., are of conventional Strowger types. The C.L.R. trunk circuits included in the main automatic exchange 20 are of any suitable type. Finally, the toll line circuits 300A, 300B, etc., and the toll selectors 500A, 500B, etc., and the combined local and toll connectors 600A are of a type such as that illustrated in detail in Patent 2,801,286 issued to Clarence E. Lomax on July 30, 1957, wherein the equipment is identified by the same numbers, not including the letter suffixes here provided.

In the distant manual exchange 10, the toll board 200 includes an inward position jack J201 and an outward position jack J203, both terminated in the intertoll dial trunk circuit 290, having associated therewith the busy lamps L202 and L204, respectively. In addition the outward position jack J203 has individually associated therewith a call lamp L205. The intertoll dial trunk circuit 290 comprises, as shown in Figs. 2 and 3, two repeating coils 240 and 390 and a relay group including the answer relay R220, a call relay R230, a supervisory relay R250, a transfer relay R260, a seizure relay R270, a control relay R310, a dial off-normal relay R320, a pulsing relay R330, a control relay R340, a dial relay R350, a hold relay R360, a control relay R370, and a ring down relay R380.

The intertoll repeater 400 comprises, as shown in Figs. 4 and 5, two repeating coils 410 and 460, and a relay group including a switching relay R420, a ring relay R430, a control relay R440, a control relay R450, a line relay R510, a hold relay R520, a release relay R530, a digit relay R540, a control relay of the polar type R550, a transfer relay R560, and a ring relay R570.

Preferably, each of the toll selectors 690 comprises, as shown in Fig. 6, a relay group including a hold relay R620, a line relay R630, a hold relay R640, a busy relay R650, a vertical off-normal relay R660, a transfer relay R670, and a test relay R610. Further, the toll selector 690 comprises a Strowger mechanism 680 provided with a wiper set including a negative line wiper, a positive line wiper, and a control wiper, a vertical magnet VM685 for driving the wiper carriage step by step in the vertical direction, a rotary magnet RM687 for driving the wiper carriage step by step in the rotary direction, and a release magnet RL686 for releasing the wiper carriage and for causing it to be returned to its normal rotary and vertical positions. Also associated with the wiper carriage of the Strowger mechanism 680 is a set of vertical off-normal springs 666 which is operated when the wiper carriage is driven one step in the vertical direction away from its normal vertical position and a set of switch springs 646 that is operated when the wiper carriage is driven eleven steps in the rotary direction away from its normal rotary position.

As previously noted, the toll board 900 in the main automatic exchange 20 is of the manual dial type and comprises, as shown in Fig. 9, a number of cord circuits including the cord circuit 910 that terminates at a rear plug P918 and a front plug P919. Also the cord circuit 910 comprises a rear ring key K920, a front ring key K921, a rear dial key K922, and a front dial key K923, as well as a relay group including a rear supervisory relay R930, a dial relay R935, and a front supervisory relay R940; and also a rear supervisory lamp L928 and a front supervisory lamp L929. Further, the cord circuit 910 is connectible to a head set 927, and an impulse transmitting mechanism of the dial type 924 associated with the cord circuit 910 is disposed at the toll board 900.

The trunk 860 extending to the toll call circuit 800 terminates in a jack J911 individual thereto at the toll board 900 and is provided with an individually associated busy lamp L932. Similarly, the trunk 945 extending from the C.L.R. trunk circuit terminates in a jack J912 individual thereto at the toll board 900 and is provided with an individually associated call lamp L946; the trunk 950 extending from the inward trunk circuit 1060 terminates in a jack J913 individual thereto at the toll board 900 and is provided with an individually associated call lamp L956; the trunk 960 extending to the toll trunk circuit 700 terminates in a delayed ring jack J914 and in an automatic ring jack J915 at the toll board 900 and has associated therewith, respectively, busy lamps L967 and L968; while the trunk 970 extending to the toll trunk circuit 700A terminates in the delayed ring jack J916, and in the automatic ring jack J917 in the toll board 900 and are provided with the busy lamps L971 and L972, respectively.

Preferably, each of the toll trunk circuits in the group including the toll trunk circuits 700 and 700A is identical to the toll trunk circuit 700 which comprises, as shown in Fig. 7, a repeater coil 770 and a relay group including a hold relay R710, a seizure relay R720, an automatic ring relay R730, a hold relay R740, a control relay of the polar type R750, a dial off-normal relay R760, and a manual ring relay R780.

Preferably, each of the toll call circuits is identical to the toll call circuit 800 which comprises, as shown in Fig. 8, a repeating coil 810 and a relay group including a hold relay R820, a ring relay R830, a control relay R840, and a seizure relay R850.

Preferably, each of the inward trunk circuits is identical to the inward trunk circuit 1060 which comprises, as shown in Fig. 10, a control relay R1070, an answer relay R1080, a ring relay of the differential type R1086, a line relay R1090, a supervisory relay R1095, and a recall relay R1110.

As pointed out previously, the information trunk 1010 terminates in the information board 1000 at a jack J1040 individual thereto and is provided with a busy lamp L1041 and a transfer key K1037 for transferring calls thereto from the jack J1040 to a multipled night position. Preferably, each of the information trunk circuits is identical to the information trunk circuit 1010 which comprises, as shown in Fig. 10 a relay group, including an answer relay R1011, a control relay R1020, and a line relay R1030.

A better understanding of the connection and arrangement of the apparatus incorporated in the telephone system will be facilitated from a consideration of the extension of calls involving the various exchanges.

*Section 3.—Local calls in the main exchange*

First assuming that a call is initiated at the subscriber station T1 in the main automatic exchange 20 to be completed locally to another subscriber station therein, the line circuit 885 is controlled via the subscriber line 884 in order to govern the operation of the distributor 890 over the start conductor C888; whereby an idle one of the links, such, for example, as the finder-selector link 891 illustrated, is selected. The finder portion of the link 891 operates to find the subscriber line 884 extending to the calling subscribed station T1; whereby the line circuit 885 is operated in order to mark the subscriber line as busy to other links having access thereto. Also the selector portion of the link 891 operates to return dial tone over the subscriber line 884 to the calling subscriber station T1; whereby the subscriber at the calling subscriber station T1 proceeds to dial the directory number of the called subscriber station; which number is a three digit number in the present illustration. The first digit dialed at the calling subscriber station T1 effects operation of the selector portion of the link 891; whereby it operates to select first the group of trunks extending to the corresponding group of combined local and toll connectors including the combined local and toll connector 600A, and then to select an idle trunk in that group. Assuming that the first idle trunk in the group of trunks extending to the group of combined local and toll connectors is that trunk individual to the combined local and toll connectors 600A, the second and third digits dialed at the calling subscriber station T1 govern the operation of the combined local and toll connector 600A; whereby it operates to select the subscriber line extending to the called subscriber station. The subsequent operation of the combined local and toll connector 600A depends upon the idle or busy condition of the called subscriber station, and is in accordance with the practices described in detail in the above mentioned co-pending application of Clarence E. Lomax. Also the subsequent completion of the established connection as well as the ultimate release thereof is in accordance with the description given in the above described application.

*Section 4.—C.L.R. calls in the main exchange*

Now assuming that a call initiated at the calling subscriber station T1 is to be extended to the toll board 900 in the main automatic exchange 20, a link, such, for example, as the finder-selector link 891 illustrated, is taken into use in the manner previously explained. The subscriber at the calling subscriber station T1 then dials the single digit "0," whereby the selector portion of the ling 891 responds thereto to select first a group of trunks including the trunk 883 extending to the corresponding group of C.L.R. trunk circuits, including the C.L.R. trunk circuit 882 and then to select an idle trunk therein. For example, the selector portion of the link 891 may select via the trunk 883 the particular C.L.R. trunk circuit 882; whereby the C.L.R. trunk circuit 882 creates a calling condition on the trunk 945 extending therefrom, completing a circuit for illuminating the call lamp L946 associated with the jack J912 terminating the trunk 945 at the toll board 900. The illumination of the call lamp L946 at the toll board 900 indicates to the operator thereat that a C.L.R. call is waiting to be answered on the trunk 945; whereby the operator selects an idle cord circuit such, for example, as the cord circuit 910, and inserts the rear plug P918 thereof into the jack J912. When the rear plug P918 of the cord circuit 910 is thus inserted into the jack J912, the first contacts of jack J912 are closed, thereby applying ground potential to the associated conductor in the trunk 945; whereby the C.L.R. trunk circuit 822 is controlled to complete a loop between the calling subscriber station T1 and the cord circuit 910 at the toll board 900, and to interrupt the circuit to the lamp L946, whereby the lamp is extinguished. The loop from the calling subscriber station T1 to the toll board 900 extends via the subscriber line 884, the line circuit 885, the finder-selector link 891, the trunk 883, the C.L.R. trunk circuit 882, the trunk 945, the tip and the ring of the jack J912, the tip and the ring of the rear plug P918, the second and fourth contacts of the rear ring key R920 and the second and fourth contacts of the rear dial key K922 to the head set 927 of the cord circuit 910 at the toll board 900. Also at this time, ground potential from a high impedance source is applied to the sleeve of the jack J912 and completes a circuit extending via the sleeve of the rear plug P918 the winding of relay R930 and the contacts 936 to battery, whereby a circuit is completed for energizing the winding of the rear supervisory relay R930; however, the latter relay does not operate at this time as it is of the marginal type. The subscriber at the calling subscriber station then advises the operator at the toll board 900 concerning the extension of the toll call or the other toll service required.

Subsequently, when the subscriber at the subscriber station T1 disconnects, the C.L.R. trunk circuit 882 is controlled to apply ground potential from a low impedance source to the sleeve of the jack J912 in order to cause the marginal type relay R930 to operate over the previously traced circuit. Upon operating, the rear supervisory relay R930 completes at contacts 931 a circuit for illuminating the rear supervisory lamp L928 in order to render disconnect supervision to the operator at the toll board 900. When the operator at the toll board 900 withdraws the plug P918 of the cord circuit 910 from the jack J912, the circuit for maintaining operated the rear supervisory relay R930 is interrupted causing the latter relay to restore and extinguish the rear supervisory lamp L928. Also, the first contacts of the jack J912 are opened; whereby the C.L.R. trunk circuit 882 is released bringing about the release of the finder-selector link 891; whereupon the line circuit 885 is governed in order to mark the subscriber line 884 extending to the subscriber station T1 as idle to the connectors having access thereto.

*Section 5.—A call from the toll board in the main exchange to a subscriber station in the main exchange*

Now assuming that a call is initiated at the toll board 900 by the operator selecting an idle cord circuit, such, for example, as the cord circuit 910 and inserting the front plug P919 into the jack terminating the trunk 960 extending to the toll trunk circuit 700. The trunk 960 is terminated at the toll board 900 by a jack J914 associated with the manual ring facilities of the toll trunk circuit 700 and is terminated by the jack J915 associated with the automatic ring facility of the toll trunk circuit 700. When the operator at the toll board 900 inserts the plug P919 into the jack J914, the toll trunk circuit 700 is controlled over the trunk 960. Specifically, the first contacts of the jack J914 are closed to apply ground potential to the conductor C961 of the trunk 960 which is extended via contacts 712 to operate the seizure relay R720 in the toll trunk circuit 700. Upon operating, the seizure relay R720 closes at contacts 725 ground potential to the conductor C965 of the trunk 960, whereby the busy lamps L967 and L968 are illuminated to indicate the toll trunk circuit 700 as busy, and opens at contacts 723 the circuit for applying battery potential to the conductor C878 of the trunk 875, whereby the latter trunk is marked as busy to the toll selectors having access thereto. In addition, relay R720 closes at contacts 724 a circuit extending from ground potential via the winding of the dial off-normal relay R760, contacts 746, conductor C964 of the trunk 960, the sleeve of jack J914, the sleeve of plug P919, the winding of the front supervisory relay R940 and contacts 937 to battery potential whereby relay R760 is operated and relay R940 remains restored, the latter being of the marginal type; additionally, relay R720 closes contacts 721 and 722 to connect the line conductors C876 and C877 of the trunk 875 extending from the toll line circuit 300A to the toll trunk circuit 700. The relay R760 upon operating closes at contacts 765 the circuit for energizing the lower winding of the control relay R750 and closes at contacts 764 a loop circuit extending from the toll line circuit 300A via the trunk 875 through the upper winding of the control relay R750; whereby the latter relay is not operated inasmuch as it is of the polar type. Specifically, and as pointed out in detail in the above mentioned application of Clarence E. Lomax, the toll line circuit 300A normally applies ground potential to the conductor C876 and battery potential to the conductor C877 of the trunk 875, whereby the above mentioned loop circuit extends via conductor C876, contacts 721, the upper winding of the coil 771, resistor 755, the upper winding of the control relay R750, the lower winding of the coil 771, contacts 764 and contacts 722 to the conductor C877; upon completion of this loop the toll line circuit 300A and the associated toll selector 500A are seized and prepared to receive dialing impulses. Thereafter, the operator at the toll board 900 closes the second and fourth contacts of the front dial key K923 and dials at the dial mechanism 924 a three digit number in order to extend the connection from the toll selector 500A to the called subscriber station. In dialing the first digit, the operator moves the dial mechanism 924 off-normal, whereby contacts 926 therein are closed to complete a circuit for operating the dial relay R935, which upon operating, removes at contacts 937 battery potential from the plug P919, whereby the operated off-normal relay R760 is restored. The relay R760 opens at contacts 764 and 765 to open the previously traced loop circuit through the upper winding of the control relay R750 and the relay energizing circuit through the lower winding of the control relay R750, whereby the latter relay remains restored, and completes at contacts 761 and 763 a loop circuit from the toll line circuit 300A through the dial mechanism 924. Specifically, the loop circuit extends from the toll line circuit 300A via the conductor C876 of the trunk 875, contacts 721, contacts 761, the conductor C962 of the trunk 960, the tip of jack J914, the tip of plug P919, the first contact of key K921, the second contacts of key K923, contacts 925 of the dial mechanism 924, the fourth contact of key K923, the third contact of key K921, the ring of plug P919, the ring of jack J914, conductor C963 of the trunk 960, contacts 763 and 722 to the conductor C877 of the trunk 875 extending to the toll line circuit 300A. Thereafter when the dial is released, the contacts 925 are interrupted to transmit dialing impulses over the above traced loop circuit to the toll line circuit 300A and to the associated toll selector 500A, whereby the toll selector 500A is controlled to select the group of trunks having access to combined local and toll connectors in the main automatic exchange 20 and to select an idle trunk in that group. At the end of the first digit the dial off-normal contacts 926 in the cord circuit 910 are opened and the dial relay R935 is restored, whereby the dial off-normal relay R760 is operated in a manner previously described to interrupt at contacts 761 and 763 the previously traced loop circuit through the dial mechanism 924 and to complete at contacts 764 and 765 the previously traced loop circuit through the upper winding of the control relay R750 and the energizing circuit through the lower winding of the control relay R750.

First assuming that all of the trunks accessible to the toll selector 500A are busy, the toll selector 500A controls the toll line circuit 300A to reverse from normal the polarity of the conductors C876 and C877 of the trunk 875 extending to the intertoll dial trunk circuit 700, at a rate of 120 times a minute whereby the control relay R750 is operated and restored at the same rate. Upon operating, the relay R750 closes at contacts 751 a circuit shunting the resistor 755 to increase the current flow through the upper winding of the latter relay, in order to make the relay more sensitive to changes in the current flow through the loop, closes contacts 752 for completing a circuit from ground potential via contacts 724 and including contacts 744 to operate the hold relay R740, and closes contacts 753 to prepare a circuit for operating the supervisory lamp L929 in the cord circuit 910. Upon operating, the hold relay R740 closes a hold circuit thereto at contacts 743, closes at contacts 745 a circuit extending from battery potential via resistor 733 to maintain relay R760 operated, and completes at contacts 748 and 747 a circuit which is interrupted 120 times a minute at contacts 753 extending from ground potential via the conductor C964 of the trunk 960, the sleeve of jack J914, the sleeve of the plug P919, the winding of the supervisory relay R940 and contacts 937, to battery potential, whereby the relay R940 is operated and restored 120 times a minute to close at contacts 941 a circuit for flashing the supervisory lamp L929 at the same rate. Thereupon the operator at the toll board 900 is rendered group busy supervision.

In order to release the operated equipment, the operator at the toll board 900 withdraws the front plug P919 of the cord circuit 910 from the jack J914 thereby interrupting the circuit for maintaining seizure relay R720 operated, whereby the loop extending to the toll line circuit 300A is interrupted at contacts 721 and 722, contacts 723 are closed to apply battery potential to the conductor C878 of the trunk 875, thereby indicating that the trunk 875 is idle, and opening at contacts 724 the circuit for maintaining the hold relay R740 and the dial off-normal relay R760 operated. Upon restoring, the relay R760 opens at contacts 764 and 765 the circuits for energizing the control relay R750, whereby the latter relay is restored. At this time the connection between the calling toll board 900 and the toll line circuit 300A and its associated toll selector 500A is released and all of the apparatus involved therein is completely released and available for further use.

Now assuming that the trunk 881 extending to the combined local and toll connector 600A is the first idle trunk in the group of trunks having access to combined local and toll connectors, the toll selector 500A seizes the combined local and toll connector 600A over the trunk 881 and switches through so that further dial impulses repeated thereto from the toll line circuit 300A are transmitted to the combined local and toll connector 600A. The operator at the toll board 900 proceeds to dial the second and third digits, whereby the dial mechanism 924 and the toll trunk circuit 799 are operated in a manner as described above to transmit dial impulses over the conductors C876 and C877 of the trunk 875 through the toll line circuit 300A, the toll selector 500A and trunk 881 to the combined local and toll connector 600A. The combined local and toll connector 600A is controlled by these dialing impulses to select the called subscriber line terminated at the contact set appearing before the impulse operated wiper set of the Strowger mechanism and proceeds to test for the idle or busy condition thereof.

First assuming that the call is to the subscriber station T1 and that the subscriber line 884 tests idle, the combined local and toll connector 600A thereupon controls the toll line circuit 300A via the trunk 881 and the toll selector 500A to reverse from normal the polarity of the conductors C876 and C877 of the trunk 875, whereby the control relay R750 in the toll trunk circuit 700 is operated in a manner as previously described to operate the hold relay R740 and to illuminate the supervisory lamp L929 of the cord circuit 910 in the toll board 900, so as to render seizure supervision to the operator thereat.

The called subscriber line is now ready to be rung and, accordingly, the operator at the toll board 900 closes the second and fourth contacts of the front ring key K921 to apply battery potential and ground potential to the ring and tip respectively of the front plug P919 of the cord circuit 910, and shortly thereafter restores the front ring key K921 to interrupt the second and fourth contacts thereof, whereby battery potential and ground potential are removed from the ring and tip of the front plug P919. The potentials on the ring and tip of the plug P919 completes a loop through the manual ring relay R780 over a path extending from the tip of the plug P919, the tip of the jack J914, conductor C962, contacts 762, the upper winding of the coil 773, the winding of relay R780, the lower winding of the coil 773, conductor C963, the ring of jack J914 to the ring of the plug P919, whereby the relay R780 is operated. Upon operating, the relay R780 closes at contacts 781, ground potential via a circuit including contact 741, 764 and 722 to the conductor C877 of the trunk 875 and closes at contact 782, ground potential via contacts 742 and 721, to the conductor C876 of the trunk 875, whereby the toll line circuit 300A is controlled to operatae the ringer of the combined local and toll connector 600A in order to extend a ringing signal over the subscriber line 884 to the called subscriber station T1. When the ring key K921 is restored in a manner as previously explained to remove battery and ground potential from the tip and ring of the plug P919, the manual ring relay R780 is restored and accordingly ground potential is removed from the conductors C876 and C877 of the trunk 875. When the subscriber at the called station T1 answers the call, the combined local and toll connector 600A is operated to control the toll line circuit 300A to reverse back to normal the polarity of the conductors C876 and C877, whereby the control relay R750 is restored and the contacts 753 are opened to interrupt the traced circuit for operating the supervisory relay R940, whereby the supervisory lamp L929 is extinguished to render the operator thereat answer supervision, and the contacts 754 are closed to complete a hold circuit from ground potential including contacts 748 and 712 for maintaining the seizure relay R720 operated. The operator at the toll board 900 may now switch cord circuits without interrupting the connection by withdrawing the front plug P919 of the cord circuit 910 from the jack J914 and inserting the plug of another cord circuit into the jack J914. During the perior that the jack J914 is without a plug, the relay R720 is maintained over the previously traced path from ground potential, whereby the hold relay R740 and the dial off-normal relay R760 are also maintained operated. The operator may now complete a connection between the calling party and the called subscriber station T1.

The operator at the toll board 900 maintains supervision of the call and assuming that the cord circuit 910 has been used in completing the connection, the operator thereat will be rendered disconnect supervision when the called party at the subscriber station T1 interrupts the connection. Specifically, the interruption of the connection at the subscriber station T1 operates the combined local and toll connector 600A to control via the trunk 881 and the toll selector 500A the toll line circuit 300A to again reverse from normal the polarity of the conductors C876 and C877 of the trunk 875, whereby the control relay R750 is operated to interrupt at contacts 754 the previously traced hold circuit to relay R720 and to complete at contacts 753 the previously traced circuit over the conductor C964 of the trunk 960 for operating the supervisory relay R940 in the cord circuit 910; whereby the supervisory lamp L929 in the cord circuit 910 is illuminated to render the operator thereat disconnect supervision.

In order to release the established connection, the operator at the toll board 900 withdraws the front plug P919 of the cord circuit 910 from the jack J914 interrupting the circuit for maintaining the seizure relay R720 operated, whereby the relays R740, R760 and R750 are further restored and the conductors C876 and C877 of the trunk 875 are disconnected from the trunk circuit 700 and battery potential is applied to the conductor C878 of the trunk 875 to indicate the trunk is idle. The toll line circuit 300A, the toll selector 500A, and the combined local and toll connector 600A are all released and the line circuit 885 is operated to mark the subscriber line 884 as idle to other connectors having access thereto. At this time, the established connection between the calling toll board 900 and the called subscriber line 884 is released and all of the apparatus involved therein is completely released and available for further use.

Considering again the extension of the call to the subscriber line 884 and assuming that the subscriber line 884 tests busy, the combined local and toll connector 600A thereupon operates to control via trunk 881 and the toll selector 500A the toll line circuit 300A to reverse the polarity of the conductors C876 and C877 of the trunk 875 at the rate of 60 times a minute, whereby the control relay R750 is operated and restored in a manner as previously described at the rate of 60 times per minute to cause the supervisory lamp L929 in the cord circuit 910 to flash at the same rate, whereby the operator in the toll board 900 is rendered line busy supervision and thereupon may release the connection in a manner as previously described so that all of the apparatus involved therein is completely released and available for further use.

As previously explained, the trunk 960 is also terminated in the toll board 900 by a jack J915 which is associated with the automatic ring facility of the intertoll dial trunk circuit 700. Now assuming that a call is initiated at the toll board 900 by the operator inserting the front plug P919 of the cord circuit 910 into the jack J915 terminating the trunk 960 extending to the toll trunk circuit 700, the first contact of the jack J915 closes ground to the conductor C966 of the trunk 960 through the winding of the automatic ring relay R730, contacts 712 and the winding of the seizure relay R720 to battery potential, whereby the relays R720 and R730 are operated. As described above, the relay R720 connects the trunk 875 to the toll trunk circuit 700 and marks the trunk 875 as busy to the toll selectors having access thereto, lights the busy lamps L967 and L968 at the toll board 900, and operates the dial off-normal relay R760. Thereafter, when the operator at the toll board 900 operates the front dial key K923 and the dial mechanism 924 and dials the three digit number, the cord circuit 910 and the toll trunk circuit 700 are operated in a manner as previously described to transmit the dialing impulses over the trunk 875 to the toll line circuit 300A. At the end of the third digit the relay R760 in the toll trunk circuit 700 is operated and assuming that the called subscriber line 884 is idle, the toll line circuit 300A is controlled to reverse from normal the polarity of the conductors C876 and C877 of the trunk 875, whereby the control relay R750 in the intertoll dial trunk circuit 700 is operated causing the hold relay R740 to operate. Upon operating, the hold relay R740 completes at contacts 741 a circuit extending from ground potential via contacts 731, 764 and 722 for applying ground potential to the conductor C877 of the trunk 875 and completes at contacts 742 a circuit including contacts 732 and 721 for applying ground potential to the conductor C876 of the trunk 875, whereby the toll line circuit 300A is operated to cause the called line to be rung. At the same time, relay R740 closes, at contacts 749, a shunt path around the winding of relay R730, whereby the seizure relay R720 is maintained operated and the automatic ring relay R730 is restored. Upon restoring, relay R730 interrupts at contacts 731 and 732 the above traced paths for applying ground potential to conductors C876 and C877 of the trunk 875. At the same time, the operator at the toll board 900 is, by the operation of relays R740 and R750, rendered seizure supervision by the illuminated supervisory lamp L929 in the cord circuit 910, in a manner as previously described. However, as the called line is in this instance, automatically rung, by the operation of relay R730 in the trunk circuit 700, the operator does not close the second and fourth contacts of the front ring key K921. When the call is answered at the subscriber station T1, the polarity of conductors C876 and C877 is reversed back to normal, whereby the control relay R750 in the toll trunk circuit 700 is restored, and the supervisory lamp L929 in the cord circuit 910 is extinguished to render the operator thereat answer supervision. Thereafter the operator at the toll board 900 may change cords, complete the connection from the calling station to the called subscriber station T1, and upon being rendered disconnect supervision, may release the connection in the same manner as above described, whereby all of the apparatus involved in the connection is completely released and available for further use.

*Section 6.—A call from the toll board in the main exchange to a station in the remote office*

Now assuming that a call is initiated at the toll board 900 by the operator inserting the front plug P919 of the cord circuit 910 into the jack J916 terminating the trunk 970 extending to the toll trunk circuit 700A and associated with the manual ring facilities thereof. The toll trunk circuit 700A, inasmuch as it is identical to the toll trunk circuit 700, is operated in a manner as described in Section 5 hereof to seize the conductors C871 and C872 of the trunk 870 and to mark the conductor C873 of the trunk 870 as busy to the group of toll selectors having access thereto. The conductors C871 and C872 of the trunk 870 are connected directly to the toll line circuit 300B which is individually associated with a toll selector 500B having access to a group of trunk lines including the trunk line 880 extending to a toll switch train in the remote office. The operator at the toll board 900 upon dialing the first digit of the called number in the cord circuit 910 causes dialing impulses to be transmitted from the cord circuit 910 via the trunk 970 through the toll trunk circuit 700A and the trunk 870 to the toll line circuit 300B, in the same manner as described above in Section 5, whereby the toll selector 500B is operated to select an idle one of the group of trunk lines extending to the remote office. Responsive to the busy condition of all of these trunk lines, the operator in the toll board is rendered a trunk busy supervision by the supervisory lamp L929 in the cord circuit 910 being flashed at the rate of 120 times a minute, and responsive to the idle condition of one of the trunk lines in the group such, for example, as the trunk line 880 illustrated, the toll selector 500B is switched through and prepared to transmit thereover to the toll switch train in the remote office the further digits repeated thereto from the toll line circuit 300B. Thereafter, when the operator at the toll board 900 dials the remaining digits of the called number, the dial impulses corresponding thereto are transmitted from the cord circuit 910 to the toll switch train in the remote office in the manner as previously explained. Line busy supervision is rendered to the operator at the toll board 900 by the reversal of the polarity of conductors C871 and C872 of the trunk 870 at the rate of 60 times a minute, whereby the supervisory lamp L929 is flashed at the same rate, and responsive to the idle condition of the called station, the polarity of the conductors C871 and C872 is reversed from normal, whereby the supervisory lamp L929 of the cord circuit 910 is illuminated steadily and the operator at the toll board 900 is rendered seizure supervision. The called station is rung by the operator at the toll board 900 closing the first and second contacts of the front ring key K921 and responsive to the answer of the call at the station in the remote office, the operator at the toll board 900 is rendered answer supervision by the polarity of conductors C871 and C872 of the trunk 870 being again reversed to their normal polarity, whereby the supervisory lamp L929 of the cord circuit 910 is extinguished. Thereupon, the operator at the toll board 900 may change cords, complete the connection from the calling station in the main automatic exchange 20 to the called station in the remote office and upon being rendered disconnect supervision by the lamp L929 of the cord circuit 910 therein being illuminated, the operator may release the connection by withdrawing the front plug P919 from the jack J916, whereby all of the equipment involved in the connection is completely released and made available for further use.

Inasmuch as the toll trunk circuit 700A is identical to the toll trunk circuit 700, the trunk 970 extending from the former is also terminated at the toll board 900 by a jack J917 associated with the automatic ring facilities of the toll trunk circuit 700A. Calls extended from the toll board 900 in the main automatic exchange 20 to a station in the remote office via the jack J917 are controlled, supervised, completed and released, as described above and in Section 5 hereof.

*Section 7.—A call from the toll board in the main exchange to the operator's position in the manual exchange*

Now assuming that a call is initiated at the toll board 900 by the operator inserting the rear plug P918 into the jack J911 terminating the trunk 860 extending to the toll call circuit 800. The first contacts of the jack J911 are closed to apply ground potential via the conductor C861 of the trunk 860 to operate the seizure relay R850 in the toll call circuit 800. Upon operating, the relay R850 closes at contacts 854 a circuit for applying ground potential to the conductor C865 of the trunk 860, whereby the busy lamp L932 at the toll board 900 associated with the jack J911 is illuminated to indicate the toll call circuit 800 as busy; closes at contacts 856 ground potential to the conductor C474 of the trunk 470 extending to the intertoll repeater 400, whereby a circuit is completed via contacts 521 therein for operating the switching relay R420; and closes at contacts 851 a circuit for applying ground potential via the winding of relay R840 and the contacts 832 to the conductor C471 of the trunk 470. Upon operating, the switching relay R420 in the intertoll repeater 400 closes contacts 426, connecting the outgoing conductor C404 associated with the windings 411 of the repeater coil 410 to the conductor C471 of the trunk 470, and closes at contacts 422 and 424 a loop through the windings 412 of the repeater coil 410 over the conductors C472 and C473 of the trunk 470 through the windings 811 of the repeater coil 810 in the toll call circuit 800. Ground potential on the conductor C471 of the trunk 470 is applied via contacts 426, conductor C404, the windings 411, the conductors C402 and C403 of the toll line 401 through the windings 392 of the repeater coil 390 to the inward conductor C393 of the intertoll dial trunk circuit 290 in the distant manual exchange 10 and via contacts 331, 271 and 221 therein through the winding of the call relay R230 to battery potential, whereby the control relay R840 in the toll call circuit 800 of the main automatic exchange 20 is connected in series with the call relay R230 in the intertoll dial trunk circuit 290 in the distant manual exchange 10 and both of the relays are operated.

In the toll call circuit 800, the relay R840 upon operating closes at contacts 841 a circuit extending from ground potential via the conductor C864 of the trunk 860, the sleeve of the jack J911, the sleeve of the rear plug P918, the rear supervisory relay R930 and contacts 936 to battery potential for operating relay R930. Upon operating relay R930 closes contacts 931 for illuminating the rear supervisory lamp L928 in order to render the operator at the toll board 900 seizure supervision. At the same time, relay R840 closes at contacts 843 a circuit from ground potential via contacts 824 through the upper winding of the two step hold relay R820 to battery for operating the relay R820 through its first step in order to complete at contacts 823 a circuit from ground potential via contacts 824, the lower winding of R820, contacts 823 and contacts 853 to ground potential. At this time, the contacts 821 and 822 remain open and the contacts 824 remain closed.

In the intertoll dial trunk circuit 290 of the distant manual exchange 10, the relay R230 upon operating closes at contacts 231 a circuit for illuminating the call lamp L205 associated with the inward jack J203 at the manual board 200, and closes at contacts 232 a circuit for illuminating the busy lamps L202 and L204 individually associated with the inward jack J201 and the outward jack J203 associated with the intertoll dial trunk circuit 290. Responsive to the illumination of the call lamp L205, the operator at the manual board 200 in the distant manual exchange 10 inserts the rear plug of a cord circuit thereat into the jack J203, thereby closing the first contacts thereof and extending ground potential via the conductor C212, the winding of the answer relay R220 and contacts 273 to battery potential, whereby the relay R220 is operated. Upon operating, the relay R220 opens at contacts 223 the circuit extending from the first contacts of the inward jack J201 to the seizure relay R270 so as to prevent seizure of the intertoll dial trunk circuit 290 from the toll board 200 during this call period, and closes at contacts 225 ground potential to the conductor C215 for maintaining the busy lamps L202 and L204 operated. Further relay R220 opens at contacts 221 the previously traced path for operating relay R230, whereby the latter relay restores, and closes at contacts 222 the previously traced path from ground potential through the control relay R840 in the toll call circuit 800 of the main automatic exchange 20 through the winding of relay R250 to ground potential in the intertoll dial trunk circuit 290 of the distant manual exchange 10 whereby the relay R840 is also restored. Upon restoring, the relay R230 removes ground at contacts 231 from the conductor C214, whereby the lamp L205 at the manual board 200 is extinguished.

In the toll call circuit 800, relay 840 interrupts at contact 841 the circuit extended via conductor C864 of the trunk 860 to the cord circuit 910, whereby the rear supervisory lamp L928 is extinguished in order to render to the operator thereat answer supervision. In addition, relay R840 interrupts at contacts 843 the circuit for applying ground potential to the upper and lower windings of the hold relay R820, whereby a circuit is completed from battery potential through the upper and lower windings thereof, contacts 823 and 853 to ground potential, whereby the relay is operated to its second step, closing contacts 821 and 822 and opening contacts 824. At this time, contacts 822 complete a circuit from ground potential via contacts 842 and 852 for holding the relay 850 operated, thereby permitting the operator at the toll board 900 to change cords and the operator at the manual board 200 to change cords. Inasmuch as the relay R850 is maintained operated over the previously traced hold circuit the connection therefrom to the intertoll dial trunk circuit 290 in the distant manual exchange 10 is maintained during the period that that cord circuit is being changed at the jack J911. In the distant manual exchange 10, the withdrawal of the plug of the cord circuit from the jack J203 causes relay R220 to restore and the relay R230 to operate in series with the relay R840 in the toll call circuit 800. Upon inserting the plug of another cord circuit into the jack J203, the relay R220 is again operated and the relay R230 restored along with the relay R840 in the toll call circuit 800. If both cords are removed at the same time the connection between the toll board 900 in the main automatic exchange 20 and the toll board 200 in the distant manual exchange 10 are released. However, as the relay R230 operates to illuminate the call lap L205 at the toll board 200 when the cord circuit is being changed at the toll board 900, the operator at the toll board 200 is thereby rendered notice of the change of cord at the toll board 900 and should change cords only when the call lamp L205 is extinguished. Similarly, the changing of cords at the toll board 200 causes the control relay R840 to operate, whereby the supervisory lamp L928 of the cord circuit 910 is illuminated to render the operator thereat notice of the fact that the cord is being changed at the toll board 200 and that the cord should be changed at the toll board 900 only when the supervisory lamp L928 is extinguished. The operator at the toll board 900 may converse with the operator at the toll board 200 and both may further extend the connection therefrom to complete a call from a calling station in the main automatic exchange 20 to a called station in the distant manual exchange 10.

When the party at the called station in the distant manual exchange 10 disconnects, the operator at the toll board 900 in the main automatic exchange 20 may rering the called station by closing the first and third contacts of the ring key K920 to apply battery potential to the tip of the rear plug P918 and to apply ground potential to the ring of the rear plug P918 of the cord circuit 910, whereby a circuit is completed from battery potential via the tip of the jack J911, conductor C862 of the trunk 860, the upper winding of the coil 812, contacts 821, the winding of the ring relay R830, the lower winding of the coil 812, conductor C863 of the trunk 860 to ground potential at the ring of jack J911. Thereupon the relay R830 operates to close at contacts 831 battery potential via the resistor 833 to the conductor C471 of the trunk 470 and thereover via contacts 426, conductor C404, the windings of the coil 411, the conductors of the toll line 401, the windings of the coil 392, conductor C393, contacts 331, 271 and 222 through the winding of relay R250 to ground potential, whereby relay R250 is operated. Upon operating relay R250 closes at contacts 252 and 253, a circuit extending from ground potential through the winding of relay R260 and contacts 224 to the conductor C213 to the sleeve of jack J203, whereby the supervisory lamp associated with the cord circuit inserted in the jack J203 is illuminated to give the operator at the manual board 200 rering supervision. In addition relay R260 is operated and upon operating closes holding ground potential thereto at contacts 261. When the rear ring key K920 is operated to open the first and third contacts thereof, the relays R830 and R250 restore, thereby opening contacts 252 and 253. Relay R260 is maintained from ground potential via contacts 261, the winding thereof, resistor 251, contacts 224, conductor C213 and the sleeve of jack J203 to battery potential on the sleeve of the plug inserted therein, whereby the supervisory lamp associated therewith is maintained illuminated, even though the resistor 251 increases the impedance of the traced circuit in order to permit relay R260 to restore more easily when the answer key is operated at the toll board 200. Upon operation of the answer key, relay R260 is restored and the operator at the toll board 900 is free to converse with the operator at the toll board 200.

Assuming that supervision of the call is retained at the toll board 900 and that the cord circuit 910 is used for completing the connection therefrom to the toll board 200 in the distant manual exchange 10, the operator at the toll board 200 renders the operator at the toll board 900 disconnection supervision by withdrawing the plug of the cord circuit thereat from the jack J203, whereby relay R220 is restored and relay R230 is operated in series with relay R840 in the toll call circuit 800. Relay R840 upon operating closes at contacts 841 the previously traced circuit for operating the rear supervisory relay R930 in the cord circuit 910, whereby the rear supervisory lamp L928 is illuminated. In addition relay R840 opens at contacts 842 the hold circuit to relay R850 so that when, in response to disconnect supervision, the operator at the toll board 900 withdraws the rear plug P918 of the cord circuit 910 from the jack J911, relay R850 restores causing relay R840 to restore along with relay R230 in the intertoll dial trunk circuit 290 of the distant manual exchange 10, and relay R820 is restored shortly thereafter. At this time, ground potential is removed from the conductor C474 of the trunk 470, whereby the switching relay R420 in the intertoll repeater 400 is restored and all of the equipment involved in the connection is completely released and made available for further use.

*Section 8.—A call from the distant manual exchange to a subscriber station in the main exchange*

Now assuming that a call is initiated at the toll board 200 in the distant manual exchange 10 by the operator thereat inserting a front plug of a cord circuit into the inward jack J201 which terminates in the intertoll dial trunk circuit 290. Thereupon ground is closed at the first contacts thereof extending via conductor C208 and contacts 223 to the seizure relay R270; whereby the latter relay is operated. Upon operating, relay R270 closes at contacts 272 a circuit extending from battery potential on the sleeve of jack J201 including conductor C211 and contacts 312 and the winding of the dial off-normal relay R320; whereupon the latter relay operates. At the same time, relay R270 opens at contacts 273 the circuit extending to the answer relay R220, whereby the latter relay is prevented from operating during this calling period, and closes contacts 276 for extending ground potential via conductor C215 to illuminate the busy lamps L202 and L204. The relay R320 is of the low resistance type and operates in series with the supervisory relay in the selected cord circuit so that the supervisory lamp in the cord circuit (not shown) is illuminated to give at this time seizure supervision. In addition, relay R320 closes at contacts 323 a circuit extending from ground potential via resistor 314 for operating the pulsing relay R330. Upon operating, relay R330 closes at contacts 332 a circuit between the intertoll dial trunk circuit 290 and the intertoll repeater 400. Specifically, the circuit extends from ground potential in the intertoll dial trunk circuit 290 via the winding of relay R340, contacts 332, conductor C393, windings of coil 392, conductors C402 and C403 of the toll line 401, the windings of the coil 411, conductor C404, contacts 425 and 451 and the winding of the line relay R510 to battery potential. Relay R340 operates and completes at contacts 341 a circuit including contacts 274 and 373 for operating the dial relay R350, whereby the latter relay closes at contacts 353 a circuit including contacts 275, 313 and 374 for operating the hold relay R360. The relay R360 upon operating closes a hold circuit thereto at contacts 362 and prepares at contacts 361 a circuit for operating the control relay R310.

In the intertoll repeater 400, relay R510 closes at contacts 512 a circuit for operating the hold relay R520, whereupon a circuit is closed at contacts 522 for operating the release relay R530. In addition, relay R510 closes contacts 511 to complete a loop extending from the intertoll repeater via the trunk 580 to the line relay R630 in the toll selector 690. Specifically, the loop extends from battery potential via the upper winding of the relay R630, contacts 651 and 621, conductor C581 of the trunk 580, the upper winding of the coil 462, resistor 554, the upper winding of the control relay R550, the lower winding of the coil 462, contacts 511, conductor C582 of the trunk 580, and contacts 623 through the lower winding of the relay R630 to ground potential; whereby the relay R630 is operated and the upper winding of the control relay R550 is energized. At the same time relay R520 opens at contacts 521, the circuit extending from battery potential via the switch relay R420 to the conductor C474 of the trunk 470 extending to the toll call circuit 800 so as to prevent seizure of the intertoll repeater 400 by the toll call circuit 800. Relay R530 upon operating closes ground at contacts 531 for energizing the lower winding of the control relay R550, whereby both of the windings of the relay R550 are at this time energized and the relay is prevented from operating, as it is of the polar type. In addition, ground potential closed at contacts 531, operates the control relay R440 via the winding thereof and contacts 431. In addition, relay R530 closes contacts 533 to operate via contacts 563, the ring relay R570 and closes contacts 534 for preparing a hold circuit for the line relay R510. In addition, relay R530 closes contacts 535 for preparing a circuit to operate the digit relay R540 and closes at contacts 536 ground potential to the conductor C475 of the trunk 470 extending to the toll call circuit 800 and via contacts 855 therein over the conductor C865 of the trunk 860 terminated in the jack J911 at the toll board 900 for illuminating the busy lamp L932 thereat to indicate that the intertoll repeater 400 is busy. In addition, relay R530 closes at contacts 532 ground potential to conductor C583 of the trunk 580 extending to the toll selector 690, whereby the transfer relay R670 therein is operated through its upper winding.

In the toll selector 690 the relay R630 closes contacts 631 for operating via the contacts 621 the hold relay R640. Upon operating relay R640 prepares at contacts 643 a circuit for operating the test relay R610 and prepares at contacts 641 another circuit for operating the vertical magnet VM685. At this time the intertoll dial trunk circuit 290, the incoming intertoll repeater 400 and the toll selector 690 have been operated and the intertoll dial trunk circuit 290 and the incoming intertoll repeater 400 are prepared to receive and transmit dialing impulses to the toll selector 690.

Thereafter when the operator at the toll board 200 in the distant manual exchange 10 operates the dial mechanism in the selected cord circuit, battery potential is removed from the sleeve of the jack J201, whereby the dial off-normal relay R320 in the intertoll dial trunk circuit 290 is restored. The relay R320 closes contacts 321 to by-pass the relay R340 to ground potential at contacts 372, whereby the control relay R340 is restored; closes contacts 322 to complete a hold circuit including contacts 275 and 352 to the dial relay R350; and opens contacts 323 and closes contacts 324 to complete a pulsing circuit to the relay R330 from the tip and ring of the jack J201. Specifically, the pulsing circuit extends from ground potential via the upper winding of the coil 241, conductor C209, the tip of jack J201, the dialing mechanism in the selected cord circuit (not shown), the ring of jack J201, conductor C210, the lower winding of the coil 241, contacts 277, 375 and 324 through the winding of the relay R330 to battery potential, whereby the pulsing relay R330 is maintained operated. Upon release of the dial in the selected cord circuit of the toll board 200, the pulsing circuit is interrupted in accordance with the dial impulses, whereby the pulsing relay R330 is restored and reoperated with each dial impulse. The relay R330 upon restoring and reoperating opens and closes at contacts 332, the previously traced circuit extending from ground potential via the toll line 401 through the line relay R510 in the incoming intertoll repeater 400, whereby the line relay R510 follows the dialing impulses so as to restore and reoperate with each. The relay R510 upon restoring opens contacts 512 to the hold relay R520 which remains operated as it is of the slow to release type and closes contacts 513 for completing a circuit from ground potential including contacts 535 for operating the digit relay R540, which remains operated during the digit impulsing, as it is of the slow to release type. In addition the relay R510 upon restoring and reoperating interrupts and recompletes at contacts 511 the previously traced loop extending via the trunk 580 from the upper and lower windings of the line relay R630 in the toll selector 690, whereupon the line relay R630 restores and reoperates with each interruption to follow the dial impulsing. Also at this time the relay R540 upon operating closes contacts 541 for by-passing the resistor 544 and the upper winding of the control relay R550 in the previously traced loop in order to improve pulsing in the loop circuit. At this time the relay R550 does not operate because the current is flowing only through the lower winding thereof. In the toll selector 690, the relay R630 upon restoring and reoperating interrupts at contacts 631 the circuit for operating the relay R640, whereby the relay R640 is maintained operated as it is of the slow to release type, and completes and interrupts at contacts 632 a pulsing circuit including contacts 628, 641 and 653 for energizing the lower winding of the operated transfer relay R670 and for operating the vertical magnet VM685. Each time the vertical magnet VM685 is operated, it steps the wiper carriage of the Strowger mechanism 680 one step in a vertical direction away from its normal vertical position, and associates the wiper set thereof with the level of contacts terminating a selected group of trunks. When the wiper carriage of the Strowger mechanism 680 is first stepped in the vertical direction away from its normal vertical position, the vertical off-normal springs 666 are operated to close at contacts 665 a circuit for operating the vertical off-normal relay R660 to close contacts 662 in order to prepare a circuit for operating the release magnet RL686 and interrupts at contacts 661 the previously traced path from ground potential on the conductor C583 of the trunk 580 for energizing the upper winding of the transfer relay R670. Thus at the end of the first digit, relay R330 in the intertoll dial trunk circuit 290 is operated, relay R510 in the intertoll repeater 400 is operated and the digit relay R540 therein is restored and the relay R630 in the toll selector 690 is operated and contacts 631 are closed to maintain relay R640 operated and contacts 632 are opened to interrupt the previously traced circuit for energizing the lower winding of the transfer relay R670 and for operating the vertical magnet VM685. Shortly thereafter the transfer relay R670, being of the slow to release type, restores completing at contacts 671 a circuit extending from ground potential and including contacts 644, 655, 612, 663, 629 and 613 for operating the self-interrupting rotary magnet RM687; whereby the wiper carriage of the Strowger mechanism 680 is driven one step in the rotary direction away from its normal rotary position. At this time the wipers of the Strowger mechanism 680 engage the contact set terminating the first trunk of the selected group of trunks and the test relay R610 tests the idle or busy condition of the first mentioned.

Now assuming that the first number dialed by the operator at the distant manual exchange 10 operated the Strowger mechanism 680 of the toll selector 690 to the level of the group of trunks including the trunk 875 and that the contacted first trunk therein is busy, the test relay R610 is not operated inasmuch as the latter relay operates only when the C wiper of the Strowger mechanism 680 selects a trunk having battery potential on the control conductor thereof. Responsive to non-operation of relay R610, the operating circuit of the rotary magnet RM687 is again completed at contacts 613 upon restoring of the magnet, whereby the magnet is again operated to drive the wiper carriage of the Strowger mechanism 680 an additional step in the rotory direction away from its normal rotary position; whereby the test relay R610 tests the idle or busy condition of the second trunk in the group mentioned that is selected at this time. This stepping and testing operation of the rotary magnet RM687 and test relay R610 continues until an idle trunk in the group mentioned is selected by the wiper set or until the wiper carriage of the Strowger mechanism is driven eleven steps in the rotary direction away from its normal rotary position.

Now assuming thaat the trunk 875 in the group mentioned is the first idle trunk available to the wiper set of the Strowger mechanism 680, when the trunk 875 is selected, battery potential appearing upon the control conductor C878 thereof completes a circuit through the winding of the test relay R610 and via contacts 643 to ground potential, whereby the test relay R610 is operated to interrupt at contacts 612 the previously traced path for operating the rotary magnet RM687 and completes at contacts 611 a circuit including contacts 644 and 655 for operating the hold relay R620. Upon operating, the relay R620 closes at contacts 627 a hold circuit thereto and closes at contacts 626 a circuit in multiple therewith for applying ground potential from the conductor C583 of the trunk 580 over the control wiper of the Strowger mechanism 680 to the conductor C878 for operating via contacts 723, the relay R710 in the toll trunk circuit 700. Upon operating the relay R710 closes at contacts 714 ground potential to conductor C965 of the trunk 960 extending to the toll board 900 for illuminating the busy lamps L967 and L968 thereat to indicate that the outgoing trunk 875 from the toll trunk circuit 700 is busy, and opens at contacts 712 the circuit for operating the seizure relay R720 in order to prevent at this time seizure of the toll line circuit 700 and the outgoing trunk 875 from the toll board 900. Further, the hold relay R620 opens at contacts 621 and 623 the loop extending from the upper and lower windings of the line relay R630, whereby the latter relay restores, and completes at contacts 622 and 624 connections from the conductors C581 and C582 of the trunk 580 to the negative line wiper and positive line wiper, respectively, of the Strowger mechanism 680. In addition, relay R620 interrupts at contacts 628 the circuit for maintaining the hold relay R640 operated and shortly thereafter the relay R640 restores, it being of the slow to release type. Upon restoring, the relay R640 closes at contacts 642 a further point in a circuit to prepare the release magnet RL686 for operation, and removes at contacts 643 and 644 operating ground potential to the test relay R610 and the rotary magnet RM687, respectively. As described in the previously mentioned co-pending application to Clarence E. Lomax, the idle toll line circuit 300A terminating the trunk 875 normally applies to the conductors C876 and C877 ground potential and battery potential, respectively, whereby when these conductors are seized by the line wipers of the Strowger mechanism 680 and the conductors C581 and C582 are connected through thereto, a loop circuit is completed thereover for maintaining the control relay R550 in the intertoll repeater 400 restored. Specifically, the loop extends from ground potential on the conductor C875 of the trunk 875 via the negative line wiper of the Strowger mechanism 680, contacts 622, conductor C581 of the trunk 580, the upper winding of the coil 462, resistor 554, the upper winding of the control relay R550, the lower winding of the coil 462, contacts 511, conductor C582 of the trunk 580, contacts 624, the positive line wiper of the Strowger mechanism 680 to battery potential on the conductor C877 of the trunk 875. Responsive to the completion of the above traced loop, the toll line circuit 300A seizes the toll selector 500A, which is then prepared to respond to dialing impulses transmitted thereto.

The second digit dialed by the operator at the toll board 200 in the distant manual exchange 10 is transmitted via the intertoll dial trunk circuit 290, the toll line 401 and the intertoll repeater 400 in the same manner as described above with reference to the first digit, and is transmitted through the toll selector 690, the trunk 875, and the toll line circuit 300A to the toll selector 500A; wherein the toll selector 500A is operated to select an idle one of the trunks in the group including the trunk 881.

First assuming that all of the trunks in the group including the trunk 881 are busy, the toll selector 500A controls the toll line circuit 300A to reverse from normal the polarity of the conductors C876 and C877 in the trunk 875 at the rate of 120 times per minute, whereby the direction of current flow over the previously traced loop, including the upper winding of the control relay R550 in the intertoll repeater 400 is alternately reversed, causing the relay R550 to follow. The relay R550, upon operating and restoring, completes and then interrupts at contacts 552 a circuit for operating the transfer relay R560. Upon operating, the relay R560 interrupts at contacts 563 the previously traced circuit for operating the relay R570, whereby the latter relay restores shortly thereafter, as it is of the slow to release type, and completes at contacts 564 a circuit including contacts 533 for maintaining relay R560 operated. In addition, relay R560 prepares at contacts 565 a circuit for operating the control relay R450. Each time the relay R550 restores, it completes at contacts 553 a circuit from ground potential including the contacts 565 for operating relay R450, whereby the relay R450 is operated and restored at the rate of 120 times per minute, and with each operation, the relay R450 completes at contacts 452 a circuit from ground potential via contacts 534 and resistor 453 for maintaining the line relay R510 operated and interrupts contacts 451 to remove battery potential from the conductor C404 which is extended via the previously traced path including the toll line 401 and conductor C393 and contacts 332 to the control relay R340 in the intertoll dial trunk circuit 290, whereby the relay R340 is restored and reoperated at the rate of 120 times per minute. Upon restoring and reoperating, the relay R340 opens and closes at contacts 341 the circuit for operating the dial relay R350, whereby the latter relay follows, and closes and opens contacts 342 for completing from ground potential the circuit including contacts 274, 351 and 361 for operating the control relay R310 at the rate of 120 times per minute. Upon operating and restoring, the relay R310 opens and closes at contacts 312 the previously traced circuit extending to the sleeve of jack J201 in the toll board 200, whereby the supervisory lamp of the cord circuit associated therewith is flashed at the rate of 120 times per minute to render the operator thereat group busy supervision. Thereupon, the operator at the toll board 200 releases the equipment included in the connection by withdrawing the front plug of the selected cord circuit from the jack J201, whereby the intertoll dial trunk circuit 290, the intertoll repeater 400, the toll selector 690, the toll trunk circuit 700, the toll line circuit 300A, and the toll selector 500A are all released and made available for further use.

Now assuming that in the group of trunks including the trunk 881, the trunk 881 is idle, the toll selector 500A seizes the combined local and toll connector 600A individual to the trunk 881 and switches the toll line circuit 300A therethrough, so that succeeding digits dialed by the operator at the toll board 200 in the distant manual exchange 10 control the combined local and toll connector 600A to select the contacts terminating the called subscriber line 884.

Now assuming that the subscriber line 884 is marked as busy by the line circuit 885 individual thereto, the combined local and toll connector 600A controls the toll line circuit 300A to reverse the normal polarity of the conductors C875 and C877 of the trunk 875 at the rate of 60 times per minute, whereby the control relay R550 and the control relay R450 in the intertoll repeater 400 are operated and restored at the rate of 60 times per minute in a manner as previously described; whereby the control relay R340 and the control relay R310 in the intertoll dial trunk circuit 290 follow the operating and restoring of the relay R450 so that the supervisory lamp individual to the selected cord circuit in the toll board 200 is flashed at the rate of 60 times per minute to render the operator thereat line busy supervision. Thereupon the operator at the toll board releases the equipment utilized in the connection by withdrawing the front plug of the selected cord circuit from the jack J201.

Now assuming that the subscriber line 884 is idle and is seized by the combined local and toll connector 600A, the line circuit 885 individual thereto is operated to mark the subscriber line 884 as busy to other connectors having access thereto and the toll line circuit 300A is controlled to reverse from normal to polarity of the conductors C876 and C877 of the trunk 875, thereby causing the control relay R550 in the intertoll repeater 400 to operate, whereby the transfer relay R560 is operated and the ring relay R570 is restored shortly thereafter. Upon operating the transfer relay R560 closes at contacts 561 a circuit including the contacts 571 and the upper winding of the coil 462 for applying ground potential to the conductor C581 of the trunk 580 which is extended via the conductor C876 of the trunk 875 to the toll line circuit 300A. Thereupon the toll line circuit 300A is operated to control the combined local and toll connector 600A for applying ringing signals to the subscriber station T1 individual to the subscriber line 884 and for returning ring-back tone over the conductors C876 and C877 of the trunk 875 to the intertoll repeater 400 which ring-back tone is repeated via the repeaters 460 and 410 over the toll line 401 to the intertoll dial trunk circuit 290 and via the repeaters 390 and 240 thereof to the operator at the toll board 200 in the distant manual exchange 10. Upon restoring, the ring relay R570 interrupts the previously traced circuit at contacts 571 for applying ground potential to the conductor C581.

When the subscriber at the station T1 answers in response to the ringing, the combined local and toll connector 600A controls the toll line circuit 300A to reverse the polarity of the conductors C876 and C877 to normal, whereby the relay R550 in the intertoll repeater 400 is restored and the control relay R450 is operated in a manner as previously described. The relay R450 upon operating causes the control relay R340 in the intertoll dial trunk circuit 290 to restore, whereby the control relay R310 operates to cause the supervisory lamp of the selected cord circuit in the toll board 200 of the distant manual exchange 10 to be extinguished, whereby the operator thereat is rendered answer supervision. Upon operating, the relay R310 opens at contacts 313 the circuit for operating the hold relay R360, whereby the relay R360 is energized from ground potential via contacts 275, the winding of the control relay R370 and contacts 362 to battery potential, so that relays R360 and R370 are operated in series. Upon operating, relay R370 opens contacts 374 for preventing the relay R360 from being operated over the by-passed circuit, closes contacts 371 for maintaining relay R340 operated, closes contacts 376 for preparing a circuit to operate the ring-down relay R380. At this time, the operator at the toll board 200 may change cords inasmuch as the relay R310 maintains the seizure relay R270 operated from ground potential at the contacts 311, and in the incoming intertoll repeater 400, the control relay R450 maintains the line relay R510 operated; and the operator at the toll board 200 may complete the connection from the calling station in the distant manual exchange 10 to the called subscriber station T1 in the main automatic exchange 20.

At the end of the call, the called party interrupts the connection causing the combined local and toll connector 600A to again reverse from normal the polarity of the conductors C876 and C877, whereby the relay R550 in the incoming intertoll repeater 400 is operated to cause the relay R450 to restore thereby causing the relay R340 in the intertoll dial trunk circuit 290 to operate and the control relay R310 to restore. Thereupon relays R320 and R330 are operated and the supervisory lamp of the selected cord circuit is illuminated to render the operator thereat disconnect supervision.

At this time the operator at the toll board 200 in the distant manual exchange 10 may rering the called party by operating the ring key of the selected cord circuit therein for applying battery potential to the ring of the jack J201, whereby the ring-down relay R380 is operated over a circuit extending from the ring of jack J201 via the conductor C210, the lower winding of the coil 241, contacts 277, and contacts 376. Upon operating, relay R380 connects at contacts 382 and 384 a 20 cycle ringing generator via the repeater coil 390, the toll line 401, and the repeater coil 410 to intertoll repeater 400, whereby the ring relay R430 is operated over a path including the capacitor which conducts current of the 20 cycle frequency. Upon operating relay R430 removes battery potential at contacts 431 from relay R440, whereby the latter relay restores thereby completing at contacts 441 a circuit including the contacts 562 for operating the ring relay R570. Upon operating, the ring relay R570 completes at contacts 571 the previously traced circuit for applying ground potential via the conductor C581 of the trunk 580 to the toll line circuit 300A, in order to cause the subscriber station T1 to be rerung. When the ring key of the selected cord circuit in the toll board 200 is opened, the relays operated in response thereto are restored, whereby ringing is interrupted at the recalled subscriber station. Thereupon, the called party may answer in response to the rering and the operator at the toll board 200 is rendered seizure supervision and is free to converse with the party at the subscriber station T1.

Reconsidering the extension of the connection from the toll selector 690 and assuming that all of the trunks in the group including the trunk 875 are busy, the rotary magnet RM687 steps the wiper carriage of the Strowger mechanism 680 to its eleventh step, whereby the springs 646 are operated to close at contacts 645 a circuit for operating from ground potential on the conductor C583 of the trunk 580, the busy relay R650. Upon operating, the busy relay R650 interrupts at contacts 651 the previously traced loop for maintaining the line relay R630 operated, whereby the latter relay restores and completes at contacts 652 a loop extending from the toll selector 690 for returning busy tone to the operator at the toll board 200. Specifically, the busy loop extends from the source of busy tone through the capacitor 664, contacts 652, contacts 621, conductor C581 of the trunk 580, the upper winding of the coil 462, capacitor 463, the lower winding of the coil 462, contacts 511, conductor C582 of the trunk 580, contacts 623, and the lower winding of relay R630 to ground potential. The busy tone is repeated via repeaters 460 and 410 over the toll line 401 to the intertoll dial trunk circuit 290 to the operator at the toll board 200 in the distant manual exchange 10. In response to the busy signal, the operator at the toll board 200 withdraws the front plug of the selected cord circuit from the jack J201, thereby causing the relays R270, R320, R330, R340 and R350 to restore. Upon restoring, relay R330 closes contacts 331, thereby connecting relays R230 in the intertoll dial trunk circuit 290 in series with the line relay R510 in the intertoll repeater 400, whereby relays R510, R520, R530 and R570 are restored. Relay R530 removes ground potential from the conductor C583 of the trunk 580, whereby the busy relay R650 of the toll selector 690 is restored. Upon restoring relay R650 completes at contacts 654 a circuit including contacts 628, 632, 642, 654 and 662 for operating the release magnet RL686. Upon operating, the release magnet RL686 causes wiper carriage of the Strowger mechanism 680 to restore to its normal vertical and rotary positions, whereby the springs 646 and 666 are opened and relay R660 is restored. At this time, all of the equipment utilized in the connection is released and made available for further use.

*Section 9.—A call from the distant manual exchange to a station in the remote office*

Now assuming that a call is to be extended from the toll board 200 in the distant manual exchange 10 to a station in the remote office, the operator at the toll board 200 inserts a front plug of a selected cord circuit into the inward jack J201 which terminates in the intertoll dial trunk circuit 290; thereupon the intertoll dial trunk circuit 290 in the distant manual exchange 10, the intertoll repeater 400 and the toll selector 690 in the main automatic exchange 20 are seized and operated in a manner as described in Section 8. Thereafter, the operator at the toll board 200 operates the dial mechanism of the selected cord circuit to transmit through the intertoll dial trunk circuit 290 and the intertoll repeater 400 to the toll selector 690 the proper digit for causing the Strowger mechanism 680 of the toll selector 690 to make contact with the group of trunks including the trunk 870 having access to a group of toll line circuits and toll selectors, including the toll line circuit 300B and the individually associated toll selector 500B.

Now, assuming that the first number dialed by the operator at the distant manual exchange 10 operates the Strowger mechanism 680 of the toll selector 690 to the level of the group of trunks including the trunk 870, and that the first trunk contacted therein is busy, the Strowger mechanism 680 is operated in a manner as previously explained to select and test another trunk of the group. This stepping and testing operation continues until an idle trunk in the group mentioned is selected by the wiper set, or until the wiper carriage of the Strowger mechanism is driven eleven steps in the rotary direction away from its normal rotary position.

Now assuming that the trunk 870 in the group mentioned is the first trunk available to the wiper set of the Strowger mechanism 680, ground potential is applied to the conductor C873 thereof, whereby the trunk circuit 700A is controlled to illuminate busy lamps L971 and L972 at the toll board 900 in order to indicate the trunk 870 as busy, and is controlled to prevent seizure of the trunk 870 at this time via the toll trunk circuit 700A. Further, upon seizure of the trunk 870, the toll selector 690 is further operated so that a loop circuit is completed, extending from the toll line circuit 300B over the line conductors C871 and C872 of the trunk 870 over a previously traced path, including the control relay R550 in the intertoll repeater 400, whereby the relay R550 is maintained in its restored state. At the same time the toll line circuit 300B seizes the toll selection 500B which is then prepared to respond to the dialing impulses directed thereto.

Thereafter, the operator at the toll board 200 in the distant manual exchange 10 dials the second digit, which is transmitted via the intertoll dial trunk circuit 290, the toll line 401, and the intertoll repeater 400 in the same manner as was the first digit, and is transmitted through the toll selector 690, the trunk 870, and the toll line circuit 300B to the toll selector 500B; wherein the toll selector 500B is operated to select an idle one of the trunks in a group, including the trunk 880 extending to the remote office.

First assuming that all of the trunks in the group, including the trunk 880 are busy, the toll selector 500B controls the toll line circuit 300B to reverse the normal polarity of the conductors C871 and C872 in the trunk 870 at the rate of 120 times per minute, whereby, the direction of current flow through the upper winding of the control relay R550 in the intertoll repeater 400 is alternately reversed, causing the relay R550 to follow. In a manner as previously explained, each time the relay R550 restores and reoperates, the relay R450 is operated and restored, thereby causing the control relay R340 in the intertoll dial trunk circuit 290 to be restored and reoperated at the rate of 120 times a minute, so that the supervisory lamp associated with the selected cord circuit at the toll board 200 is flashed at the rate of 120 times per minute to render the operator thereat group busy supervision. Thereupon the operator at the toll board 200 releases the equipment included in the connection by withdrawing the front plug of the selected cord from the jack J201, whereby the intertoll dial trunk circuit 290, the intertoll repeater 400, the toll selector 690, the toll trunk circuit 700A, the toll line circuit 300B, and the toll selector 500B are all released and made available for further use.

Now assuming that in the group of trunks, including the trunk 880, the trunk 880 is idle, the toll selector 500B seizes the trunk 880 and switches the toll line circuit 300B therethrough so that succeeding digits dialed by the operator at the toll board 200 in the distant manual exchange 10 are transmitted to the remote office for operating the switching equipment therein in order to seize the line of the called station. When the called station in the remote office is seized, the toll line circuit 300B is controlled to reverse from normal the polarity of conductors C871 and C872 of the trunk 870, thereby causing the control relay R550 in the intertoll repeater 400 to operate, whereby the transfer relay R560 is operated and a previously traced circuit is completed at contacts 561 for applying ground potential to the conductor C581 of the trunk 580, which is extended via the conductor C871 of the trunk 870 to the toll line circuit 300B. Thereupon the toll line circuit 300B is operated to extend a ringing control signal over the trunk 880 to the switching equipment in the remote office for ringing the called station, and to extend ringback tone from the toll line circuit 300B over the trunk 870 through the toll selector 690, the intertoll repeater 400 and the intertoll dial trunk circuit 290 to the operator at the toll board 200. Shortly after the relay R560 in the intertoll repeater operates, the ring relay R570 is restored, thereby interrupting at contacts 571 the previously traced circuit for applying ground potential over conductor C871 of the trunk 870 to the toll line circuit 300B.

When the called station in the remote station answers in response to the ringing, the toll line circuit 300B is again controlled over the trunk 880 to reverse the polarity of the conductors C871 and C872 to normal, whereby the relay R550 in the intertoll repeater 400 is restored and the control relay R450 is operated in a manner as previously described, thereby restoring relay R340 in the intertoll dial toll circuit 290 and operating the control relay R310 therein to cause the supervisory lamp of the selected toll circuit of the toll board 200 of the manual exchange 10 to be extinguished whereby the operator thereat is rendered answer supervision. Thereupon the operator at the toll board 200 may complete the connection from the calling station in the distant manual exchange 10 to the called station in the remote office.

At the end of the call, the party at the called station in the remote office interrupts the connection, thereby controlling the toll line circuit 300B to again reverse from normal the polarity of the conductors C871 and C872 of the trunk 870, whereby the relay R550 is operated and the relay R450 is restored, the relay R340 in the intertoll dial trunk circuit 290 is operated and the control relay R310 is restored so that the supervisory lamp of the selected cord circuit in the toll board 200 is illuminated to render the operator thereat disconnect supervision.

At this time, the operator at the toll board 200 in the distant manual exchange 10 may rering the called station in the remote office by operating the ring key of the selected cord circuit thereat in order to apply battery potential to the ring of the jack J201. Further operation of the intertoll dial trunk circuit 290 and of the intertoll repeater 400 in reringing and in extending and releasing connections are in accordance with the operation previously described in Section 8 hereof.

Reconsidering the extension of the connection from the toll selector 690 and assuming that all the trunks in the group including the trunk 870 are busy, the wiper carriage of the Strowger mechanism 680 is operated to its eleventh step, whereby the busy relay R650 is operated in a manner as previously explained, causing a tone busy signal to be returned to the operator at the toll board 200 in the distant manual exchange 10. In response to the busy signal, the operator at the toll board 200 withdraws the front plug of the selected cord circuit from the jack J201, thereby causing the relays R270, R320, R330, R340, and R350 to restore, whereupon the operated relays in the relay group of the intertoll repeater 400 are restored, and whereupon the release magnet RL686 of the toll selector 690 is operated to restore the wiper carriage of the Strowger mechanism 680 to its normal vertical and rotary positions and the operated relays of the relay group in the toll selector 690 are restored. At this time all of the equipment utilized in the connection is released and made available for further use.

*Section 10.—A call from the distant manual exchange to the toll board in the main exchange*

Now assuming that a call is to be extended from the toll board 200 in the distant manual exchange 10 to the toll board 900 in the main exchange 20, the operator at the toll board 200 inserts the front plug of a selected cord circuit into the inward jack J201 thereat, which terminates in the intertoll dial trunk circuit 290. Thereupon, the intertoll dial trunk circuit 290, the intertoll repeater 400 and the toll selector 690 are operated in a manner as explained in Section 8 hereof, and are prepared to transmit dialing impulses from the dialing mechanism of the selected cord circuit at the toll board 200 to the toll selector 690.

Thereafter, the operator at the toll board 200 at the distant exchange operates the dial mechanism in the selected cord circuit to dial a first digit for controlling the toll selector 690 to step the Strowger mechanism 680 vertically so that the wiper set thereof has access to the group of trunks including the trunk 1076 associated with the group of inward trunk circuits including the inward trunk circuit 1060. Thereupon, the wiper carriage of the Strowger mechanism 680 is stepped in the rotary direction to test the trunks in the group until an idle trunk is found or until a wiper carriage of the Strowger mechanism is driven eleven steps in the rotary direction away from its normal rotary position.

Now assuming that the trunk 1076 in the group mentioned is the first idle trunk available to the wiper set of the Strowger mechanism 680, when the trunk 1076 is selected, battery potential applied to the control conductor C1079 thereof completes a circuit via contacts 1073 and resistor 1072 for operating the test relay R610. Thereupon, the hold relay R620 is operated in a manner as previously explained to apply ground potential via the control wiper of the Strowger mechanism 680 to the conductor C1079, and opens at contacts 621 and 623, the loop extending from the upper and lower windings of the line relay R630, whereby the latter relay restores, and completes at contacts 622 and 624 connections from the conductors C581 and C582 of the trunk 580 to the negative and positive line wipers respectively of the Strowger mechanism 680. Further, the relay R620 controls the relay group in the toll selector 690 to prevent further operation of the vertical magnet VM685 and prepares a circuit for operating the release magnet RL686 which circuit is completed when the connection extended over the inward trunk circuit 1060 is later interrupted. Upon seizure of the conductors C1077 and C1078 of the trunk 1076 by the negative and positive line wipers, respectively, of the Strowger mechanism 680, a loop circuit is completed from the inward trunk circuit 1060 to the intertoll repeater 400, whereby the control relay R550 therein is operated. Specifically, the loop circuit extends from battery potential via the upper winding of the ring relay R1086 and of the line relay R1090 of the inward trunk circuit 1060 via contacts 1081, conductor C1077, the negative line wiper of the Strowger mechanism 680, contacts 622, conductor C581 of the trunk 580, the upper winding of the coil 462, resistor 554, the upper winding of the polar relay R550, the lower winding of the coil 462, contacts 511, conductor C582 of the trunk 580, contacts 624, the positive line wiper of the Strowger mechanism 680, conductor C1078, contacts 1083, the lower winding of relay R1090 and the lower winding of the differential relay R1086 to ground potential, whereby the line relay R1090 is operated and the ring relay R1086 is not operated as it is of the differential type. In the intertoll repeater 400, the current flow through the upper winding of the polar relay R550 is in a direction so as to cause the relay to operate. Upon operating the relay R550 closes at contacts 552 ground potential to the transfer relay R560; whereby relay R560 is operated and contacts 563 are opened, causing the ring relay R570 to restore a short time thereafter, and contacts 565 are closed to prepare a circuit for operating the control relay R450 at a later time. In the inward trunk circuit 1060, relay R1090 upon operating, closes at contacts 1092 a circuit from ground potential via contacts 1075 to the conductor C955 of the trunk 950 extending to jack J913 at the toll board 900, whereby the call lamp L956 thereof, is illuminated to indicate to the operator thereat that the trunk 950 is calling, and closes at contacts 1091 a circuit extending from ring-back generator and including contacts 1076 and 1083 for returning ring-back tone over the conductor C1078 of the trunk 1076 through the toll selector 690, the intertoll repeater 400 and the intertoll dial trunk circuit 290 to the toll board 200, to indicate to the operator thereat that the call is being signalled at the toll board 900.

In accordance with the illumination of the call lamp L956 at the toll board 900, the operator thereat inserts the front plug P919 of a cord circuit 910 into the jack J913 thereby closing ground potential at the first contacts thereof to the conductor C951 of the trunk 950 extending to the inward trunk circuit 1060, whereby the answer relay R1080 therein is operated via contacts 1111. Upon operating, the relay R1080 closes contacts 1082 and 1084 and opens contacts 1081 and 1083, respectively, thereby reversing the normal polarity of the line conductors C1077 and C1078 of the trunk 1076; whereby the control relay R550 in the intertoll repeater 400 is restored and a previously prepared circuit is completed at contacts 553 for operating the control relay R450. The relay R450 upon operating, closes at contacts 452 a circuit for maintaining the line relay R510 operated and opens at contacts 451 the operating circuit for the control relay R340 in the intertoll dial trunk circuit 290, all in a manner as previously explained. As pointed out in Section 8 hereof, relay R340 upon restoring, operates the control relay R310, the hold relay R360, and the control relay R370, and restores the dial-off-normal relay R320 and the dial relay R350, and at the same time extinguishes the supervisory lamp of the selected cord circuit at the toll board 200 to thereby render the operator thereat answer supervision. At the same time, relay R1080 in the inward trunk circuit 1060 closes at contacts 1085 a circuit for operating the control relay R1070; whereby a hold circuit is completed thereto at contacts 1074 from ground potential applied to the control conductor C1079 of the trunk 1076 and the circuit for applying ground potential is removed at contacts to the conductor C955 of the trunk 950 is interrupted at contacts 1075 and the call lamp L956 associated with the jack J913 in the toll board 900 is extinguished. At this time the operator at the toll board 200 in the distant exchange 10 may converse with the operator at the toll board 900 in the main exchange 20, and both operators may further extend the connection from their respective toll boards.

At the completion of the call, the operator at the toll board 900 may recall the operator at the toll board 200 in the distant exchange 10 by operating the front ring key K921 of the cord circuit 910 to close the second and fourth contacts thereof for operating the recall relay R1110 in the inward trunk circuit 1060. Specifically, upon being operated, the front ring key applies battery potential to the tip of the plug P919, and ground potential to the ring of the plug P919, whereby battery potential is extended via the tip of jack J913, conductor C952 of the trunk 950 through the winding of recall relay R1110 and via conductor C953 of the trunk 950 to ground potential on the ring of jack J913. Upon operating the relay R1110 interrupts at contacts 1111 the previously traced circuit for operating the answer relay R1080 whereby contacts 1082 and 1084 are opened and contacts 1081 and 1083 are closed to reverse to normal the polarity of the line conductors C1077 and C1078 in the trunk 1076. Thereupon, relay R550 in the intertoll repeater 400 is again operated, control relay R450 is restored, control relay R340 in the intertoll dial trunk circuit 290 is operated, relay R310 is restored and relay R320 is operated in series with the supervisory lamp of the selected cord circuit at the toll board 200 to render the operator thereat recall supervision. In accordance therewith, the operator at the toll board 200 may again converse with the operator at the toll board 900 in the main exchange 20 and any additional connections therebetween may be completed.

Additionally, at the completion of a call, the operator at the toll board 200 in the distant manual exchange 10 may recall the operator at the toll board 900 in the main exchange 20 by operating the ring key of the selected cord circuit therein, whereby the ring-down relay R380 in the intertoll dial trunk circuit 290 is operated in a manner as previously explained to cause the operation of the ring relay R430 and the ring relay R570 in the intertoll repeater 400. The operation of the relay R570 closes a circuit at contacts 571 for applying ground potential to conductors C581 and C582 of the trunk 580 which potential is transmitted via the trunk 1076 to the upper and lower windings of the differential relay R1086 in the inward trunk circuit 1060. Inasmuch as only the upper winding of the relay R1086 is energized at this time, the relay is operated, closing at contacts 1087 a circuit for applying ground potential via the winding of the supervisory relay R1095 to the conductor C954 of the trunk 950 extending to the sleeve of jack J913 at the toll board 900. Ground potential thereon is extended via the sleeve of the front plug P919 and the winding of the supervisory relay R940 and contacts 937 to battery potential so that relay R1095 in the inward trunk circuit 1060 is operated in series with the supervisory relay R940 in the cord circuit 910. The latter relay, upon operating, closes contacts 941 for illuminating the front supervisory lamp L929 to indicate to the operator at the toll board 900 that a recall is being made over a previously established circuit from the toll board 200 in the distant manual exchange 10. When the ring key in the selected cord circuit of the toll board 200 is restored, ground potential is thereafter removed from the line conductors C1077 and C1078 of the trunk 1076 so that relay R1086 is restored; however, relay R1095 is retained operated via a hold circuit completed at contacts 1096, and extending from ground potential via the resistor 1099. Thus the relay R1095 and the front supervisory lamp L929 remain operated until the front plug P919 is removed from the jack J913.

At the conclusion of an established connection between the toll board 200 in the distant manual exchange 10 and the toll board 900 in the main exchange 20, should the operator at the toll board 200 remove the front plug of the selected cord circuit from the jack J201 thereat, no relays will be affected inasmuch as, at this time, the control relay R310 in the intertoll dial trunk circuit 290 is operated, and the seizure relay R270 operated via contacts 311 and the dial-off-normal relay R320 is restored by its operating circuit having been interrupted at contacts 312 by relay R310. Thereafter, when the operator at the toll board 900 in the main exchange 20 withdraws the front plug P919 from the jack J913 in order to release the established connection, relays R1095 and R1080 in the inward trunk circuit 1060 are restored, whereby the polarity of the conductors C1077 and C1078 is again reversed to normal so that the relay R550 in the intertoll repeater 400 is again operated and the control relay R450 is restored. Thereupon, relay R340 in the intertoll dial trunk circuit 290 is operated, causing the relay R310 to restore, thereby interrupting at contacts 311 the circuit for maintaining the seizure relay R270 operated. Upon restoring, relay R270 interrupts at contacts 275 the circuits for maintaining the relays R360 and R370 operated, so that the circuit for maintaining relay R340 operated is interrupted at contacts 371 and relay R340 restores. At this time, relay R230 is connected in series with the line relay R510 in the intertoll repeater 400 from battery potential to battery potential, whereby the relay R510 restores, causing the hold relay R520 and the release relay R530 to restore shortly thereafter. In response to the restoring of relay R530, relays R440, R550 and R560 are restored, and ground potential is removed from the control conductor C583 of the trunk 580, extending to the toll selector 690. At this time, all the operated relays in the relay groups of the intertoll dial trunk circuit 290 and of the intertoll repeater 400 are restored. The removal of ground potential from the control conductor C583 of the trunk 580 causes the hold relay R620 to restore, whereupon the circuit for operating the release magnet RL686 of the toll selector 690 is completed at contacts 628, so that the wiper carriage of the Strowger mechanism 680 is restored to its normal vertical and rotary position, and the vertical-off-normal switch 666 is opened, causing the relay R660 to restore. At this time then, the wiper set of the Strowger mechanism 680 is returned to its normal position, and all of the operated relays of the relay group in the toll selector 400 are restored. Thus, in the inward trunk circuit 1060, the operating loop for the line relay R1090 is interrupted and the ground potential for maintaining the control relay R1070 operated over conductor C1079 is removed, whereby these latter relays are restored, causing battery potential to be applied again to the conductor C1079 of the trunk 1076 at contacts 1073, thereby marking the trunk as idle to the toll selector having access thereto.

At the conclusion of the entablished connection, should the operator at the toll board 900 disconnect first by removing the front plug P919 of the cord circuit 910 from the jack J913, the operated supervisory relay R1095 and the answer relay R1080 are restored as previously explained, causing the relay R550 to operate, relay R450 to restore, the relay R340 to operate, and the relay R310 to restore. However, at this time, inasmuch as the operator at the toll board 200 in the distant manual exchange 10 has not withdrawn the front plug of the selected cord circuit from the jack J201, the relay R320 operates in series with the supervisory lamp in the selected cord circuit; thereby rendering disconnect supervision to the operator at the toll board 200.

Upon receiving disconnect supervision, the operator at the toll board 200 removes the front plug of the selected cord circuit from the jack J201, whereupon relays R270, R320, R330, R360, R370, and R340 are restored; and as previously explained, relays R510, R520, R530, R440, R550 and R560 in the intertoll repeater 400 are restored; and the relays R620 and R660 in the toll selector 690 are restored and the release magnet RL686 thereof is operated to restore the wiper carriage of the Strowger mechanism 680 to its normal rotary and vertical position. Thereafter, the operated relays R1090 and R1070 in the inward trunk circuit 1060 are restored, and the trunk 1076 is marked as idle to the toll selectors having access thereto. At this time, all of the equipment involved in the connection is released and restored, and is available for further use.

*Section 11.—Call from the distant manual exchange to an information board in the main exchange*

Now assuming that a call is to be extended from a toll board 200 in the distant manual exchange 10 to an information board in the main automatic exchange 20, the operator at the toll board 200 inserts the front plug of a cord circuit into the inward jack J201 which terminates in the intertoll dial trunk circuit 290. As previously described in Section 8 hereof, the intertoll dial trunk circuit 290, the intertoll repeater 400 and the toll selector 690 are thereupon seized and operated and prepared to receive dialing impulses from the dialing mechanism of the selected toll circuit of the toll board 200. Thereupon, and in order to extend a call to the information board 1000 in the main automatic exchange 20, the operator at the toll board 200 dials a single digit in order to cause the toll selector 690 to operate its Strowger mechanism 680 to the vertical level accommodating a group of trunk lines, including the trunk 1050, having access to a group of information trunk circuits, including the information trunk circuit 1010. Thus, in response to the single digit, the Strowger mechanism 680 and the toll selector 690 is stepped to the vertical level of the group of trunks, including the trunk 1050, and thereupon the toll selector 690 steps the wiper carriage in a rotary direction and tests each trunk in the group mentioned until an idle trunk is selected by the wiper set, or until the wiper carriage of the Strowger mechanism is driven eleven steps in the rotary direction away from its normal rotary position.

Now assuming that the trunk 1050 in the group mentioned is the first idle trunk available to the wiper set of the Strowger mechanism 680, when the trunk 1050 is selected, battery potential appearing on the control conductor C1053 thereof completes a circuit through the winding of the test relay R610 whereby the last named relay is operated and the hold relay R620 is caused to operate. As previously explained, the operation of relay R620 prepares a circuit in the toll selector 690 for restoring the Strowger mechanism 680 to its normal rotary and vertical position, and it also operates to apply ground potential to the control conductor C1053 and to complete via the line wipers of the Strowger mechanism 680 and the line conductors C1051 and C1052 of the trunk 1050 a loop circuit extending from the line relay R1030 of the information trunk circuit 1010 through the upper winding of the control relay R550 in the intertoll repeater 400. Specifically, the loop circuit extends from battery potential via the upper winding of relay R1030, contacts 1016, conductor C1051, the negative line wiper of the Strowger mechanism 690, contacts 622, conductor C581 of the trunk 580, the upper winding of the coil 462, resistor 554, the upper winding of the polar relay R550, the lower winding of the coil 462, contacts 511, conductor 582 of the trunk 580, contacts 624, the positive line wiper of the Strowger mechanism 680, conductor C1052, contacts 1013, and the lower winding of the line relay R1030 to battery potential, whereby the line relay R1030 and the control relay R550 are operated. Upon operation, the line relay R1030 closes at contacts 1031 a circuit including the capacitor 1035, the contacts 1021, and the contacts 1013 for applying ring-back tone over the line conductor C1052 of the trunk 1050 to the operator at the toll board 200 in the distant manual exchange 10, and completes at contacts 1032 a circuit from ground potential, including contacts 1024 and the first contacts of the transfer key K1037 for illuminating the call lamp L1041 at the information board 1000 in the main automatic exchange 20. At the same time, relay R550 closes a previously traced circuit for operating and maintaining operated the transfer relay R560 and for preparing a circuit for operating the control relay R450.

In response to the illumination of the call lamp L1041 at the information board 1000, the operator inserts the plug of a selected cord circuit into the jack J1040 that is individual to the information trunk circuit 1010, whereby ground potential is applied at the first contacts thereof for operating the answer relay R1011. Upon operating, the answer relay R1011 closes contacts 1015 to complete a circuit for operating relay R1020 and closes contacts 1012 and 1014 and opens contacts 1016 and 1013 for reversing from normal the polarity of the line conductors C1051 and C1052 of the trunk 1050. Relay R1020 closes at contacts 1022 a hold circuit thereto from ground potential on conductor C1053, opens at contacts 1021 the circuit for returning ring-back tone to the toll board 200, and opens at contacts 1024 the circuit for illuminating the call lamp L1041. The reversal of the polarity of line conductors C1051 and C1052 causes the operated relay R550 in the intertoll repeater 400 to be restored, and the control relay R450 to be operated. Responsive to the operation of the control relay R450, the intertoll dial trunk circuit 290 is controlled so that relay R340 restores and relay R310 operates, causing the supervisory lamp of the selected cord circuit at the toll board 200 to be extinguished, thereby rendering answer supervision to the operator thereat. At that time, the operator at the toll board 200 in the distant manual exchange 10 is free to converse with the operator at the information board 1000 in the main automatic exchange 200.

At the conclusion of the established connection, should the operator at the tool board 200 remove the front plug of the selected cord circuit from the jack J201, the relays ordinarily operated thereby are not effected inasmuch as relay R270 is maintained operated by a circuit completed at contacts 311, and the relay R320 has been previously restored by its operating circuit being interrupted at contacts 312. Thereafter, when the operator at the information board 1000 removes the plug of the selected cord circuit from the jack J1040, the answer relay R1011 is restored, whereby the polarity of conductors C1051 and C1052 is again reversed to normal, causing the control relay R550 in the intertoll repeater 400 to operate and the control relay R450 to restore, whereupon, in the intertoll dial trunk circuit 290, relay R340 is operated and relay R310 is restored, causing relays R270, R360, R370 and D340 to restore in a manner as previously explained in Section 10 hereof; and as explained in the last mention section, the operated relays R510, R520, R530, R440, R550 and R560 in the intertoll repeater 400 and restored, and ground potential is removed from the control conductor C583 of the trunk 580. Subsequently, relays R620 and R660 in the toll selector 690 are restored, and the wiper carriage of the Strowger mechanism 680 is restored to its normal rotary and vertical position. At this time, the operating loop for the line relay R1030 in the information trunk circuit 1010 is interrupted at the conductor C1051 and C1052 of the trunk 1050 and the latter relay is restored, and ground potential for maintaining the control relay R1020 operated is removed from the control conductor C1053 of the trunk 1050. At this time all of the equipment is completely restored and made available for further use.

Reconsidering the release of the established connection, it is clear from the foregoing explanation and from the explanation given in Section 10 that should the operator at the information board 1000 in the main automatic exchange 20 remove the plug of the selected cord circuit from the jack J1040 prior to the time that the operator at the toll board 200 in the distant manual exchange 10 removes the front plug of the selected cord circuit from the jack J201, the relay R1011 in the information trunk circuit 1010 is restored, the control relay R550 in the inner toll repeater 400 is restored and the relay R450 is operated; and in the intertoll dial trunk circuit 290 the relay R340 operated, the relay R310 restored, and the relay R320 operated whereby the supervisory lamp in the selected cord circuit at the toll board 200 is illuminated to provide the operator thereat with disconnect supervision. Thereafter, when the operator at the toll board 200 removes the front plug of the selected cord circuit from the jack J201, relays R270, R320, R330, R340, R350 and R360 are restored; and subsequently thereat, in a manner previously explained, the operated relays in the relay group of the intertoll repeater 400 are restored, the operated relays in the toll selector 690 are restored and the wiper carriage of the Strowger mechanism 680 thereof is restored to its normal rotary and vertical position, the line relay R1030 and the control relay R1020 in the information trunk circuit 1010 are restored, and battery potential again is applied to the control conductor C1053, thereby marking the trunk as idle to the toll selectors having access thereto. At this time, all of the equipment involved in the connection are released and completely restored and available for further use.

The information board 1000, as illustrated in Fig. 10, is also provided with a multiple extension from the jack J1040 to a night position which might be located in the toll board 900. The extension includes the tip conductor C1042, the ring conductor C1043 and the first contacts conductor C1044; the call lamp at the night position is operated by closing the second contacts of the transfer key K1037 to connect the lamp conductor C1045 to the information trunk circuit 1010. Control from the night position extension is the same as that from jack J1040.

In view of the foregoing, it is apparent that there has been provided a telephone system including toll lines interconnecting the exchanges thereof and served by circuit facilities of simple arrangement permitting supervision and control of the call from the calling operator's toll board.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a first exchange and a first toll board thereat, a second exchange and a second toll board thereat, a two wire toll line interconnecting said exchanges, an intertoll dial trunk at said first exchange seizable from said first toll board, a toll call circuit at said second exchange seizable from said second toll board, an intertoll repeater at said second exchange, a toll selector at said second exchange, means for seizing said repeater from said dial trunk over said toll line responsive to seizure of said dial trunk from said first toll board, means for seizing said repeater from said toll call circuit responsive to seizure of said toll call circuit from said second toll board, means operated responsive to seizure of said repeater from said toll call circuit for seizing said dial trunk over said toll line to extend a connection from the second toll board to the first toll board, means responsive to seizure of said repeater from said dial trunk for seizing said toll selector, means for operating said seized selector in response to direct current impulses received from said first toll board via said seized dial trunk and repeater to extend a connection from said first toll board to said second toll board, two repeating coils in said dial trunk, two repeating coils in said repeater, one repeating coil in said toll call circuit, a two wire speech circuit including said toll line, means for extending said speech circuit to both said toll boards via a certain four of said five repeating coils responsive to completion of said first connection, and means for extending said speech circuit to both said boards via a different four of said repeating coils responsive to completion of said second connection.

2. In a telephone system as in claim 1, supervisory lamps at said toll boards, means for lighting the lamp at said first toll board responsive to seizure of said dial trunk therefrom on a call to said second toll board, a dial leg for said toll line, a line relay in said common repeater controlled over said dial leg responsive to said impulses to control said selector, a dial loop extended from said repeater to said second toll board via said speech circuit responsive to the extension of the connection thereto, a polar relay in said loop at said repeater, means responsive to the answering of the call at said second toll board for reversing the polarity of said loop to operate said polar relay, a control relay in said dial trunk operated over said dial leg responsive to said polar relay operation to extinguish the lamp at said first toll board, means for lighting the lamp at said second toll board responsive to seizure of said toll call circuit therefrom on a call to said first toll board, a control relay in said toll call circuit connected to said dial leg through said repeater responsive to the seizure of said repeater from said toll call circuit, means for extending the call and operating said last relay over said dial leg responsive to said last seizure, means responsive to the answering of the call at said first toll board for releasing said last relay, and means operated responsive to said release for extinguishing the lamp at said second toll board.

3. In a telephone system, a first exchange and a first toll board thereat, a second exchange and a second toll board thereat, an intertoll dial trunk accessible to said first toll board, an intertoll repeater at said second exchange accessible to said dial trunk, a two-wire toll line interconnecting said dial trunk and repeater, a first toll selector associated with said repeater, a first group of trunks accessible to said selector for extending calls to said second toll board, subscriber lines in said second exchange; a second group of trunks, second selectors and connectors at said second exchange accessible to said first selector for extending calls to said subscriber lines; a repeating coil and a dial leg at each end of said toll line, means responsive to seizure of said dial trunk from said first toll board for seizing said toll repeater via said dial legs, means responsive to said last seizure for extending a dial loop to said selector to seize the same, means for operating said seized selector responsive to a particular series of impulses transmitted thereto over said toll line to extend a connection via one of said first trunks to said second toll board, means for operating said seized selector responsive to a different series of impulses to extend said dial loop via one of said second trunks to one of said second selectors, means for operating said second selector and one of said connectors responsive to further impulses to extend a connection to one of said subscriber lines, means responsive to said first selector finding all of said trunks busy for transmitting busy tone to said first toll board via said loop, means responsive to a second selector finding all of said connectors busy for reversing the polarity of said loop at stated intervals, means responsive to a connector finding the called line busy for reversing the polarity of said loop at different intervals, a supervisory relay connected into said loop so as to reverse its position responsive to and in unison with said polarity reversals, a control relay in said dial trunk, a supervisory lamp at said first toll board, means for actuating said control relay over said dial legs responsive to the reversals of said supervisory relay, and means for flashing said supervisory lamp responsive to and in unison with the actuations of said control relay.

4. In a telephone system as in claim 6, cords and jacks for said toll boards for initiating and answering said calls thereat, means responsive to the plugging in of one of said cords into one of said jacks at said second toll board for extending a connection therefrom to said first toll board via said call circuit, said repeater and said dial trunk, and for signalling said extension to said first toll board, means for completing said connection at said first toll board responsive to the plugging of one of the said cords thereat into the signalled one of the said jacks thereat, dial legs at the respective ends of said two-wire toll line, and relay means serially controlled over said dial legs for holding the connection responsive to the withdrawal of the cord and the reinsertion of a new cord at either toll board.

5. In a telephone system as in claim 4, supervisory lamps at said toll boards, and means in said dial trunk and said toll call circuit controlled by said relay means for lighting and extinguishing said supervisory lamps as an indication that a cord is being changed, and that such change has been completed.

References Cited in the file of this patent

UNITED STATES PATENTS

| | | |
|---|---|---|
| 2,511,145 | Balzar | June 13, 1950 |
| 2,564,088 | Wicks | Aug. 14, 1951 |
| 2,596,833 | Balzar | May 13, 1952 |
| 2,603,717 | Molnar | July 15, 1952 |
| 2,744,965 | Molnar | May 8, 1956 |
| 2,805,288 | Fisher | Sept. 3, 1957 |